(12) United States Patent
Aljawhari

(10) Patent No.: US 10,176,481 B2
(45) Date of Patent: Jan. 8, 2019

(54) METHOD AND APPARATUS FOR MANAGING AND PROVIDING PROVENANCE OF PRODUCT USING BLOCKCHAIN

(71) Applicant: Mohamed Alaa Aljawhari, South Australia (AU)

(72) Inventor: Mohamed Alaa Aljawhari, South Australia (AU)

(73) Assignee: BESTON TECHNOLOGIES PTY LTD, Adelaide, South Australia (AU)

( * ) Notice: Subject to any disclaimer, the term of this patent is extended or adjusted under 35 U.S.C. 154(b) by 117 days.

(21) Appl. No.: 15/389,489

(22) Filed: Dec. 23, 2016

(65) Prior Publication Data

US 2017/0262862 A1    Sep. 14, 2017

Related U.S. Application Data

(63) Continuation-in-part of application No. 15/385,959, filed on Dec. 21, 2016, now Pat. No. 9,830,604.

(30) Foreign Application Priority Data

Dec. 21, 2015    (AU) ................................. 2015905302

(51) Int. Cl.
*G06Q 30/00*    (2012.01)
*G06F 17/30*    (2006.01)
*H04L 9/32*    (2006.01)

(52) U.S. Cl.
CPC ... *G06Q 30/0185* (2013.01); *G06F 17/30979* (2013.01); *H04L 9/3236* (2013.01); *H04L 2209/38* (2013.01); *H04L 2209/56* (2013.01)

(58) Field of Classification Search
CPC ......... G06K 19/07749; G06K 9/00577; G06K 19/025; G06K 19/0719; G06K 19/077; G06K 19/07779; G06K 2209/01

(Continued)

(56) References Cited

U.S. PATENT DOCUMENTS 5,478,990 A    12/1995 Montanari et al.
8,931,701 B2 *    1/2015 Lawandy ................. G06K 7/12
                                                235/462.01

(Continued)

FOREIGN PATENT DOCUMENTS

WO        9510812 A1    4/1995
WO    2016161483 A1    10/2016

OTHER PUBLICATIONS

Examination Report from Australian Patent Application No. 2016277684, dated Jul. 14, 2017, 5 pages.

(Continued)

*Primary Examiner* — Mark Blouin
(74) *Attorney, Agent, or Firm* — Westman, Champlin & Koehler, P.A.

(57) ABSTRACT

Described is a method for managing and providing provenance of a product using blockchain technology. There is disclosure of the association to the product of a unique product identifier as well as the optional association to the product of an anti-counterfeiting device also having a unique identifier as the product moves along the supply chain from its source phase, through the transformation phase and undergoes the transportation phase. There may be more than one product identifier or anti-counterfeiting device as the product is sometimes joined, sometimes partitioned and sometimes packaged. To manage and facilitate the generation and association of identifiers as the product moves along the supply chain there is a data memory device for storage of the unique identifier for the product and association by the server in the data memory device of the unique identifier for the product with the unique identifier of the anti-counterfeit device and other associations. The server is also adapted to receive and store in the data memory device one or more characteristics of the product existing or created as the product moves along the supply chain. Receipt by the processor of the unique identifier of a product or anti-counterfeit device with a query for the provenance of the (Continued)

product, makes available at least one characteristic associated with that product. The use of blockchain permits the creation of a block for each recorded characteristic and the retrieval of the record associated with a block and to verify that the recorded characteristic is the same as that retrieved from the block in the blockchain uniquely associated with the particular product.

5 Claims, 17 Drawing Sheets

(58) Field of Classification Search
USPC .......................................................... 340/5.86
See application file for complete search history.

(56) References Cited

U.S. PATENT DOCUMENTS

| | | | |
|---|---|---|---|
| 2006/0196945 A1* | 9/2006 | Mendels | G06K 1/12 235/470 |
| 2008/0128492 A1* | 6/2008 | Roth | G06Q 30/018 235/380 |
| 2009/0187583 A1 | 7/2009 | Pape et al. | |
| 2016/0055359 A1* | 2/2016 | Jensen | G06K 7/10366 340/10.5 |
| 2016/0267493 A1* | 9/2016 | Liu | G06Q 30/0185 |

OTHER PUBLICATIONS

U.S. Patent Office-issued prosecution documents, including: Notice of Allowability dated Aug. 17, 2017, 5 pages; and Notice of Allowance dated Aug. 7, 2017, including PTO-892, 9 pages; 14 pages total.

* cited by examiner

METHOD AND APPARATUS FOR MANAGING AND PROVIDING PROVENANCE OF PRODUCT USING BLOCKCHAIN

CROSS-REFERENCE TO RELATED APPLICATIONS

This Application is a continuation-in-part of U.S. application Ser. No. 15/385,959, filed on Dec. 21, 2016, entitled "METHOD AND APPARATUS FOR MANAGING AND PROVIDING PROVENANCE OF PRODUCT", which is a non-provisional application of Australian Patent Application No. 2015905302, filed Dec. 21, 2015, in English, the contents of which are hereby incorporated by reference in their entirety.

FIELD

The disclosure of this specification relates to products of many types, wherein perishable consumable produce and products are an example and the field of the disclosure is the management and provision of the provenance of products using blockchain technology.

BACKGROUND

Products take a unique path from their source, through one or more steps of preparation and handling, to wholesale and retail supply chain locations and eventually to the consumer at the final point of sale. A great deal of effort, extensive systems and user convenience is required, however there are none or limited ways to provide to customers any confidence that the product they are about to purchase is necessarily the product it purports to be.

The term product will be used within this specification and in some circumstances the term produce will be used as well and they may sometimes be used interchangeably.

Of more general concern is the incidence of false food labelling, e.g. fish labelled as an expensive breed when it is a different breed, or that the fish originates from the sea when it is in fact farm grown in tanks, or when the fish is said to be from one country when it in fact was caught in another where health standards can be lower or non-existent. Fish is but one of the many food stuffs that are often falsely labelled, other examples include: organically grown verses grown in unapproved farms; wine which is falsely labelled as being from a region or particular wine maker; baby formula that does not contain what are safe ingredients or correct indication as to where it was made and what the product was made from.

However, the truthfulness of labelling is but one part of the story for consumers, as some consumers are very concerned or interested in knowing the full history of the food product they wish to purchase. For example they want to know when, where and by whom the food product was grown or produced. Some retailers and wholesalers want to know how the produce was transported and in what conditions and over what time to where and how long the produce remained in storage before being made available for sale or used in another product as do consumers. Those responsible for food processing want to know the same details about their source products even when the final product is made up of many constituents some of which are straight from the source and other products are a combination of products. Consumers what to know how the final product, fresh or processed was handled, where and when and even sometimes by whom. Sometimes the consumer holds certain beliefs or have certain medical conditions that require that food be handled, processed and not be in contact with other certain foods. Some consumers are concerned about food sourced from certain regions because there are adverse local health conditions, poor regulations or lack thereof, and scandals, bribery and illegal operations which can be ignored, glossed over, miss-represented and thus there can be little or no confidence in the quality of the produce originating from that region. Some consumers are concerned about the ethical nature of the conditions of workers who grow, gather, transport and package the produce, so the history of the produce is not always related to the actual produce but the environment associated with the product and produce.

For some consumers knowing the type of information described above and more importantly believing the accompanying assurances provides a stamp of appropriateness and enhances their perception of quality, freshness, exclusiveness, and very importantly these consumers are willing to pay a premium for food products and produce for which the history is in accord with their needs and wants.

Thus food provenance on a large scale catering to thousands of consumers is needed.

However, a review of the many issues of concern, as described previously, to those in the supply chain from source to grow-out, those that transform a food product (processed or unprocessed) and those that transport a food product in whole or in portions, all the way through to the wholesaler and retailer parts of the supply chain and finally to the consumer, illustrates that there are many characteristics to track and many factors unique to the source product and the processes and environment of the product that are to be accounted for.

Not unsurprisingly, there are some specialised approaches to tracking already being used in portions of the supply chain between the source of the product to the consumer.

For example, in the livestock industry there are a number of standards which define a large number of criteria that must be met regarding blood lines (husbandry), health during the lifetime of individual livestock, meat quality testing criteria (total fat content, distribution, etc.), feed stock, slaughter and meat processing practices, etc. Hence there are systems including hardware (tags, sensors, readers and computer hardware, etc.) and associated software (tag identification creation, sensor data collectors, data management, data distribution, etc.) designed to provide assurances to the purchasers of the meat at wholesale level that the meat meets the food tracking and quality standards they say they do and which are then displayed by retailers at the point of sale behind the display glass of the retailer. The same attention to traceability applies to the food that is consumed by livestock. Food safety regarding contaminants, residues, treatment and the need for traceability to facilitate recall and assessment of cause and effect are critical. In many jurisdictions legislation and regulation deem the minimum levels of system and practice to ensure appropriate standards. However, problems still arise and assurances are not available or given even when due diligence and legal systems shift the onus to the producer or retailer to show they were diligent but are assumed to be culpable unless able to prove otherwise.

In another example, the use of the term organic on a particular food produce can be certified by one of many certifying authorities and may also be subject to additional government requirements. The food tracking involved in these arrangements is not applied to individual produce but typically applies to the output of a whole producer/farm and labelling as such is authorised under licence to the producer. Thus although the source of the produce is known not much more information is provided or available to the intermediate handlers or the consumer, since an individual product item may not be labelled or even if it there is a label the history of the item before and beyond the time of labelling is not known.

Thus although there are systems in place none provide anywhere near a comprehensive history of the produce item nor can there be concomitant assurances of the veracity of one or more characteristics of that history of the product, produce or their ingredients. Thus, the consumer is required to rely on statements made by the retailer, rely on labelling and therefore the consumer is never in a position to believe those statements and text information in the labelling and never in a position with appropriate means to verify the provenance of that product.

ASPECTS OF THE DISCLOSURE

In an aspect there is a method for managing and providing provenance of a product associated with an anti-counterfeiting device having a unique identifier, using a computer system having a computer server for processing data and a data memory device for receiving and storing data including unique identifiers of a product and anti-counterfeiting devices, where the product has at least a source version in a source phase and an anti-counterfeiting device is used in association with a source version of the product during the source, the method comprises the steps: generation by the server of a unique identifier for a source version of the product; storage in the data memory device of the unique identifier for a source version of the product; association by the server in the data memory device of the unique identifier for a source version of the product with the unique identifier of the anti-counterfeit device; receiving by the server and storage in the data memory device of one or more characteristics of the product existing or created during the source phase of the product; association by the server in the data memory device the unique identifier of the source version of the product with each of one or more characteristics of the product existing or created during the source phase of the product; receiving by the processor of the unique identifier of anti-counterfeit device with a query for the provenance of the source version of the product associated with the anti-counterfeiting device; and making available by the processor in response to the query of at least one characteristic associated with the source version of the product by using the unique identifier for the source version of the product to locate in the data memory device one or more of the characteristics of the product associated with the source version of the product.

In another aspect of the method for managing and providing provenance of a product wherein a further anti-counterfeiting device is used in association with a packaged product, the method comprises the further steps: abandonment of the anti-counterfeiting device associated with the source version of the product; generation of a unique packaging identifier for each packaged version of a portioned sourced product; association by the server in the data memory device of the unique packaging identifier with a respective packaged version of the product; application of further anti-counterfeit devices each having a unique characteristic to each packaged version of the source product; association by the server in the data memory device of the unique identifier for a packaged version of the product with the unique identifier of the anti-counterfeit device and the unique identifier of the source version of the product; receiving by the server and storage in the data memory device of one or more characteristics of the packaged product existing or created during the portioning of the source product; receiving by the processor of the unique identifier of a further anti-counterfeit device with a query for the provenance of the packaged product associated with the associated further anti-counterfeiting device; and making available by the processor, in response to the query using the unique identifier for the packaged version of the product or the unique identifier of the further anti-counterfeiting device to locate in the data memory device, one or more of the characteristics of the product associated with the packaged product.

In yet another aspect of the method for managing and providing provenance of a product, the method comprises the steps: application of an anti-counterfeit device having a unique identifier to a group of packaged versions of the product prepared for the distribution phase; association by the server in the data memory device of a unique group packaging identifier with the unique identifier of the anti-counterfeit device applied to a group of packaged versions of the product; receiving by the server and storage in the data memory device of one or more characteristics of the product existing or created during the distribution phase of the product; association by the server in the data memory device the unique identifier of the group of packaged versions of the product with each of one or more characteristics of the product; receiving by the processor of the unique identifier of anti-counterfeit device of a group of packaged versions of the product or a unique packaging identifier with a query for the provenance of the group of packaged versions of the product associated with the anti-counterfeiting device or unique packaging identifier; and making available by the processor, in response to the query using the unique identifier for the group of packaged versions of the product or the unique identifier of the anti-counterfeiting device applied to the group of packaged versions of the product to locate in the data memory device, one or more of the characteristics of the group of packaged products.

In yet another aspect a device for displaying and confirming the provenance of a product, a computer system having a computer server for processing data and a data memory device for receiving and storing data including unique identifiers of a product and anti-counterfeiting devices and data representative of one or more characteristics of the product, comprises: a visual display for displaying information; a communication mechanism for transmission and reception of information to and from the device with the computer system; at least two sensors, each sensor adapted for receiving a different sensed input, each sensed input having one or more characteristics; a digital data memory having stored therein a digital representation of expected characteristics for at least a first sensed input of one sensor and a second sensed input of another sensor; a processor for comparing sensed inputs of sensors to the expected characteristics for sensed inputs stored in the digital data memory, wherein receipt of a first sensed input by a respective sensor by exposure to the product and confirmation by the processor of a match to at least one of the expected characteristics, prompts communication using the communication mechanism of a representation of the product to the computer system of provenance information and receipt by the communication mechanism of respective provenance information and a prompt to expose a second anti-counterfeiting device associated with the product to receive a second unique identifier as a second sensed input by a respective sensor, and confirmation by the processor of a match to at least one of the expected characteristics which confirms the provenance of the product and indicated to the user of the device using the visual display.

The system, method and apparatus disclosed in this specification is intended to provide at least an alternative to the systems currently available and in doing so alleviate or minimise the problems and shortcomings associated with existing systems.

The reference to any prior art or ways of providing provenance in this specification is not, and should not be taken as, an acknowledgement of any form of suggestion that such prior art forms part of the common general knowledge.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

It will be appreciated by those skilled in the art that the disclosure described herein is not restricted in its use to the particular application described. Neither is the disclosure restricted in its preferred embodiment with regard to the particular elements and/or features described or depicted herein. It will be appreciated that the scope of the disclosure is not limited to the embodiment or embodiments disclosed, but is capable of numerous rearrangements, modifications, and substitutions without departing from the scope as set forth and defined by the claims.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs), and magnetic memory. Computers, terminals, network enabled devices (e.g. mobile devices such as cell phones) are all examples of machines and devices that utilize processors, memory, and instructions stored on computer-readable mediums.

It should be appreciated that the present disclosure can be implemented in numerous ways, including as a process, an apparatus, a system, or a computer readable medium such as a computer readable storage medium or a computer network wherein program instructions are sent over wireless, optical, or electronic communication links. It should be noted that the order of the steps of disclosed processes may be altered within the scope of the disclosure.

Details concerning computers, computer networking, software programming, telecommunications and the like may at times not be specifically illustrated as such were not considered necessary to obtain a complete understanding nor to limit a person skilled in the art in performing the embodiments, are considered present nevertheless as such are considered to be within the skills of persons of ordinary skill in the art.

The summary is provided to introduce a selection of concepts in a simplified form that are further described below in the Details Description of Embodiments. The summary is not intended to identify key features or essential features of the claimed subject matter, nor is it intended to be used as an aid in the determining the scope of the claimed subject matter.

DETAILS DESCRIPTION OF EMBODIMENTS

Figure 1:
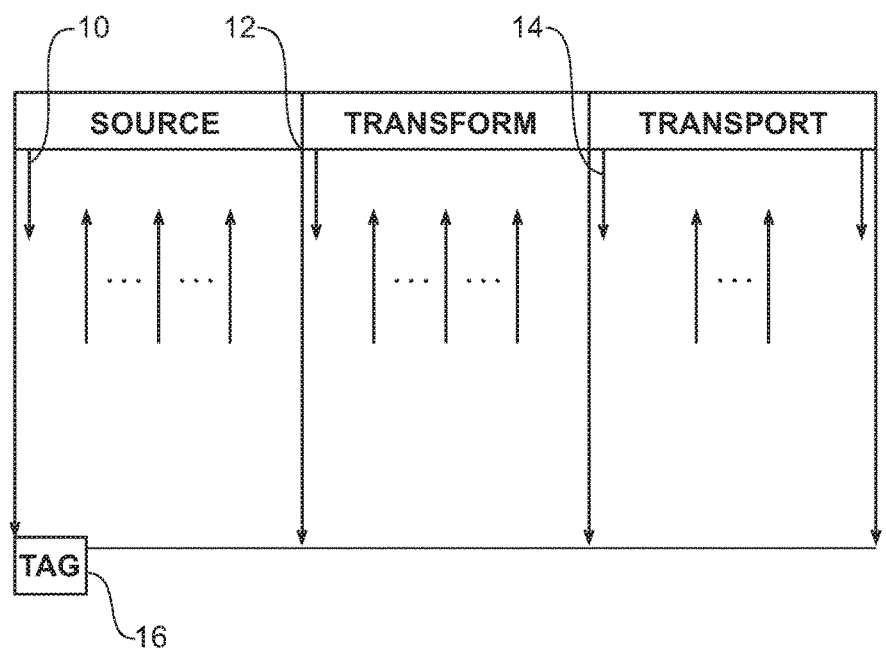
FIG. 1 depicts a pictorial representation of a time-line of the many steps and the collection of characteristics associated with those steps along a supply chain involving the use of a tag during the source phase and the supply of product code or codes from the processing server.

The traceability and veracity of products is achievable and a system to achieve that goal is by design going to comprise a large number of elements. It is not possible to describe every single element of the system but it is understood that there are many elements of the system that are known to those of skill in the art. Indeed there are many elements that are so specialised that this document could not adequately describe them but to the appropriate person or team they will be well known as will be their required inputs and outputs as they relate to the type of system disclosed herein. In fact it is an advantage to incorporate such elements into the system for all the expert aspects that those elements provide.

It will be known to those of skill in the art that there are regulated and accepted alternative numbering systems for different types of products.

By way of example of a unique numbering system for supplier, producer, products and produce, there is a Global Trade Item Number (GTIN) standard (previously known as the EAN-UUC) a globally unique way to identify items traded in a supply chain. This system of numbering and hence unique identification is used by brand owners (a company) who accept a responsibility for assigning the GTIN using a GS1 company prefix to each one of their products and in every packaging configuration for that product. The company is identified with every subsequent characteristic applied or existing, such as for example assignment to a source product at the source location (farm of produce, the fishing vessel at the time of capture, etc. and then a further identifying code is added at subsequent predetermined steps along supply chain path, and any transformation of the product, separation of the parts of the product and subsequent packaging for transportation and sale of the products or its variations and portions. In theory, since information about a product is included in the specified format and associated therewith, when the source and history of a product needs to be traced it is easily determined since all the information relating to steps along the supply chain are available in the same format (machine readable format) thus avoiding language or categorising issues.

It is possible generate these unique identifiers for different products whether that is the source version of the product or when the source version is further processed, split into multiple products or is used an ingredient in another product.

Of course there are numerous steps in the supply chain beginning at the presentation of the product at source and ending upon display at a point of sale; or delivery direct to the ultimate consumer; or upon presentation of the product or a portion or derivative thereof, on the plate of a diner (as might be the case for a perishable consumable product).

In this document three phases are used to group associated steps in the supply chain, being source phase, transformation phase and transportation phase. There are no accepted definitions of those phases but they will be known to those skilled in the art to assist in expressing the general concepts and step types in an associated system.

The term characteristic is used to cover one or more of the types of information that aligns with industry terms such as critical tracking event and key data element, although there are many other terms that may apply or will be created. For some time, paper based means to record and store such characteristics have been used but there is a trend to electronic data entry and capture and thence electronic data storage and processing for display, analysis and associated imaging of a characteristic, groups of characteristics, or information about a characteristic related to the or those characteristics.

The creation, collection and collation of characteristics is going to involve different processes such as writing and transformation into digital representations of the characteristic, the entry of the characteristic into a device which immediately or later transfers the digital representation of the characteristic to a server and associated memory for storage and collation, the automatic generation of a characteristic by machines and computer devices as the source product and any other forms of the product are processed, transported, moved, stored, labelled, packaged and any of numerous actions by that machine and/or computer device.

Some of the most complex steps arise during the transformation phase of a product.

For example, the simplest step is a simple transformation, where for example, a fish (a source version of a product) is filleted and the output is the filleted fish not the waste.

A further step can be when something is added to the product, such as adding salt to the fillet of fish so as to brine the fish. In such a step it is not just the action that is the characteristic, there is a possible need to record the brine strength, the time of processing, etc.

A yet further step is joining, where one process step combines two or more products each already having their own identification and prior traceable history. An example could be the use of more of the same product from a different batch to make up a package. The ability to trace the source/s of ingredients back through multiple levels is referred to as a multi-level trace.

Figure 12:
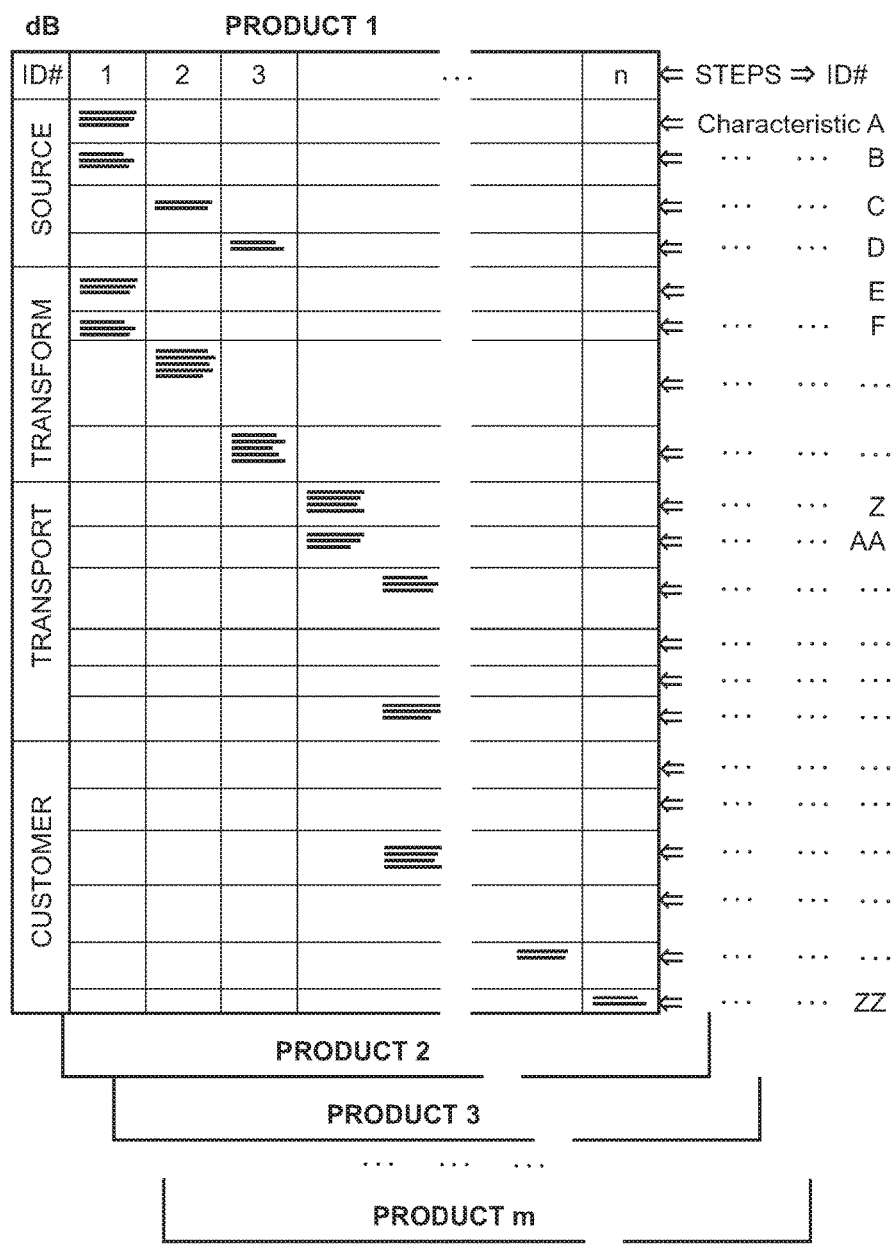
FIG. 12 depicts a pictorial representation of information recorded in the database which supports the recording of steps and associated characteristics.

A yet further step is splitting, where the one product is divided into portions of the same product. An example is a single fish after filleting being portioned, so that multiple cuts are available for sale and the head being separated for separate sale. FIG. 12 is illustrative of a data base record maintained on the data memory device and the various records of characteristics for various steps in the supply chain are visible as collated and organised records. This figure is purely illustrative since the computer processor, associated local memory and data memory device are configured to store the respective data as character strings associated with pointers to locations and associations, field characteristics for the type of data string and one or more data integrity check values.

Not unsurprisingly there are numerous characteristics to be recorded and each product has a different group of characteristics to collect at each step of the progress of the product through the source, transform and transport phases of the supply chain. It is not possible to list all the characteristics that are or could be worthy or required or even expected. Some will be mandated by standards, some by regulations, some by the internal needs of the business, some will be required since it is a customer expectation or perception that such characteristics are recorded and thus should be available for review to indicate the providence of the product or a portion thereof or of any or all the ingredients of a product. Thus a multi-level trace capability is required.

It is however practical to realise that it is impossible to provide all the recorded characteristics in a code affixed or associated with the product, either part way or at the end of the supply chain. Thus although the GS1 system is useful for purpose, particularly the one step back—one step forward approach to tracking which, by example, is very important in the perishable consumable product field. The GS1 system is one of many tools available to achieve the aim of providing a system which permits anyone along the supply chain to review one or more of the many characteristics that could to be recorded and associated with the product to establish its provenance.

By way of example the following is a non-exhaustive list of characteristics that are captured, stored and made available. Some characteristics may be common to many products and some will be unique to the product it is associated, while some will only be relevant to a single step executed during one or more or the source, transformation and transportation phases.

Weight; case; pallet; carton; date of capture; date of storage; temperature of storage; period of storage; weight leaving storage; type of product; species of product; portion category of product; method of processing; additives; batched date; batch identifier; other source products in batch; use by date; best by date; expiry date; source provider; source catcher; source license; landed port; vessel caught with; vessel processed in; vessel landed at port by; transformation provider; transportation provider; time of pick up at one or more steps; transportation time; temperature during transportation; temperature during storage; gross weight; net weight; cut; elemental composition at one or more stages; grade of product/produce according to none or a standard and if so the standard used; size; named processes; additives; process steps individually identified; processed by whom; processed with or after other products on same path; weight into a process; weight out of a process; colour, texture, shape, other physical characteristics at source and at one or more steps of the process; equipment preforming a step; storage material; packing/wrapping material; nutritional analysis; quality assurance checks done; location at which a step was taken; location of storage; transportation route; product welfare (applies to livestock) condition; labour used to handle, process and pack (including in some cases fair trade requirements); genetic codes of product; environmental circumstances pre and post capture of product or harvesting of produce; continuous processing conditions and outcomes; cleaning agents used; disinfectants used; treatment of livestock including procedures and pharmaceuticals used; handling equipment; processing equipment; importation/export agents; stevedores; transportation container identification; transformation company; transportation company; warehouse owner; retailer (bricks and mortar or on-line) that has relationship with the final consumer; food preparer for final step prior to consumption; destruction details of spoiled product, how, when, where, by which company and which operator, state of final form of product, disposal details, etc. illustrated as upward arrows in FIGS. 1 to 4 being designated a, b, c, . . . aa, bb, cc, . . . and in FIG. 12 being inputs to the recordal process at the relevant server.

Although some traceability systems provide some of the above listed characteristics it is rare that detailed analysis in the form of verification is undertaken due to the time and effort of such an exercise, even in the case of a short and simple supply chain. Typically, verification is undertaken in response to an adverse health incident where product re-call may be required and knowing that the one step up, one step down system (also known as the track forward and trace back approach) was/is used, is very important; there could otherwise be a public loss in confidence of the systems that provide traceability of a product line or branded product; etc. Of course there will be the occasional audit of the traceability of a product as part of a contract requirement; a standards compliance requirement; a regulation or governmental requirement or the practices of the company that tests their own systems. Implementation of a traceability system can also be done in conjunction with a need for a business to upgrade, improve or implement best practices in the industry sector involved.

Having identified some of the many characteristics that can be recorded there is according to an embodiment, an pictorial representation of one version of the process of multiple steps representing in this example, a whole fish product, which is tracked from the point of capture to the fish market. FIG. 1 depicts a time line from left to right and the three phases (source, transform and transport) which follow each other in the time line.

Depicted directly below the source block are multiple lines (as indicated by the . . . between some of the arrowed lines) pointing towards the SOURCE which illustrate the receipt of input by a processing server, or a memory device for storing the data (as might be the case of the recording of the time of capture of a tuna fish on an ocean going vessel by a convenient handheld device) until the data can be provided to the processing server. The data being representative of the actual output action associated with each step. The step may have been performed or associated with a particular characteristic that has been detected, imposed, or applied to the produce at a particular stage of the source stage. The types of data associated with the characteristics of the product at a step may be as described earlier or others.

Accordingly, in this embodiment, a unique product identifier is generated (pictorially represented as a downward arrow 10 from the source phase and similarly depicted as 12 and 14 in the other phases (Transformation and Transport), preferably the unique product identifier is generated by the processing server but it may be made available for use on the vessel from a batch of unique product identifiers predetermined for that purpose.

The unique identifier, can in an example, include a portion which is a unique identifier of the company that is providing the service of traceability and provenance, and any other detail which is generated in accordance with, for example the GS1 standard. The GS1 identifier is but one example of such identifiers and in some stages not appropriate, such as for example, in the final product presentation at the end of the transportations stage, where an IPC bar code is used, because there is a variable weight of the product involved and the scanning requirements in retail stores have that requirement to be met.

In this example and optionally in the method disclosed herein, the caught tune fish is physically tagged 16. The tag may be one of many types of anti-tamper/anti-counterfeiting devices. One such example of a tag is a Radio Frequency IDentification (RFID), another such device is one which can be supplied under licence from the Australian Commonwealth Scientific and Industrial Research Organisation (CSIRO) which incorporates multiple anti-counterfeiting technologies in an inert tag encapsulation, sometimes referred to as spectrum fingerprint technology. Each tag has a unique identification which becomes one of the characteristics of the product as soon as the tag is securely attached to the product. That tag identifier is associated immediately or at some time with the unique product identifier generated by the system.

Clearly, many types of tags are available and where required the tag will have physical, chemical (or no chemical), attachment, and various other characteristics, which are suited to the type of product or produce and the environment that the product will encounter, during at least, the source phase, but also possibly during the transformation and transportation phases. The choice to use a tag is likely dependent on many factors, some of which may include the value of the product, the importance to the user of the product to ensure that it is the same product at another part of the supply chain, the ease of attachment, the type of product to be tagged and in some cases the physical impossibility of tagging all relevant product.

Accordingly, in this example, the tag is intended to be located on the product from the time of capture to the point of sale, since a whole tuna fish is a commodity of itself and has value when presented for sale in an almost unaltered state. Thus as illustrated in FIG. 1 the tag remains with the product from the time of capture to sale. There may also be a physical embodiment of the generated unique identifier, in one form a bar code, which is also associated with the product so that it can be readily scanned at any stage of the supply chain phases by a scanner device which is different from a scanner that is capable to checking a tag.

There are a variety of characteristics to be accumulated as the product progresses along the supply chain, each of which may be communicated or stored for later communication by a recorder, for later processing. Examples of such characteristics in this particular embodiment as illustrated in FIG. 1, include, the date and time of capture, the vessel it was caught from, the owner of the vessel, the number and expertise of the fisherpersons on board, the method of storage, the temperature during the storage period, the temperature of the sea at the time of capture, etc.

The transformation stage, as illustrated in FIG. 1, may have fewer steps than if the tuna fish was to be filleted and cut into pieces. By way of example only, the tuna fish is stored in a saline solution for the period from capture to unloading from the capture vessel. Some examples of characteristics input from the progression of the product through the transformation stage, include the temperature of the saline solution, the strength of the saline solution, the source of the water and salt of the saline solution, the number of other tuna fish caught and stored in that manner and in the same container as the tuna fish, etc.

The transportation stage, as illustrated in FIG. 1, begins in this example, once the whole tuna fish is transferred from the vessel it was caught with to a further storage condition. Ideally the location of sale of the tuna fish is in proximity to the landing port but that may not be the case and the whole tuna fish will need to be physically transported, possibly by plane, to the whole fish market. The first action by the receivers of the whole fish is to scan the unique bar code to log entry of the product into the transportation phase along with the one or more characteristics, such as by way of example, the location of pickup, the time and date of pickup, the perceived condition of the whole tuna fish at the time of pickup, the method of handling, the container into which the whole fish is kept or transferred into, etc. There will also be further characteristics that are existing or created that arise during the transportation phase, by way of example, the length of time between the delivery and presentation of the whole fish to the purchases, the conditions of the environment in which the fish is stored during that time, etc.

At the time or before the whole fish is offered for sale a number of optional processes are available to prospective purchasers. The unique bar code which contains the unique company code is attached or associated with the whole fish. The bar code can be scanned by the wholesale purchaser and the data representative of the bar code is communicated to the processing server and information could be made available about one or more of the characteristics associated with that particular whole fish. That information may satisfy the wholesaler and that same information can be made available to prospective purchasers but it is also possible for the processing server to supply an indicator to the device used to scan the bar code that it is possible to use one or more other sensors to check the anti-counterfeiting device is the same anti-counterfeiting device that was earlier associated with the whole fish.

For example, as will be described in more detail later in this specification the device used to scan the anti-counterfeiting tag is generally a more specialised type of equipment than a bar code or similar scanner device and not likely to be available to consumer purchasers and sometimes only available to a few wholesalers, so there can be a directory providing the location of such equipment, allowing use to anyone seeking to check the authenticity of the anti-counterfeiting tag.

Along with the supply of anti-counterfeiting devices there can also be authorised, licenced or otherwise created a device which has at least two different sensors, by way of example, an electromagnetic frequency determination circuit and a chemical sensor that can discriminate the exact chemical composition made available from the anti-counterfeiting device attached to the whole fish. The description provided is but one of many alternative arrangements of physical characteristics that are difficult if not highly improbable to recreate. Once the device is determined to be the unique device originally attached to the whole fish, the unique identity of the tag can be confirmed by the scanning device and thus that data can be used to confirm the authenticity of the whole fish since the tag can include information collected and unique to the collection time, place and maybe other data made observable on the taking of the scan or the data collection system (yet to be described in any detail) can provide a confirmation of the tagging and the associated collected data relating to that event. More about anti-counterfeiting devices will be described later in the specification.

The prospective purchaser of a product can thus be assured that the fish is authentic and all the characteristics made available are associated with that fish and that fish only, by being able to confirm the authenticity of the anti-counterfeit device and associated data. Thus the provenance of the fish (the same and other data relating to one or more events recorded as the fish experienced the source, transformation and transportation phases of the supply chain) can be made available to the prospective or actual purchaser, thus if any elements of the history of the particular fish post capture is need or desired, then it can be provided. That same information can be made available to consumers along with additional information created and provided by the preparers of the fish for consumption, which can add to the interest and enjoyment of the consumer. An example of additional information can be pictures of the region, the farm, the processing factory, those pictures (still, video and multi-media) are presentable by way of personal computing devices, (mobile phone, computer tablets, etc.) and can be considered as providing entertainment value to the process of purchasing and to prospective purchasers.

Figure 2:
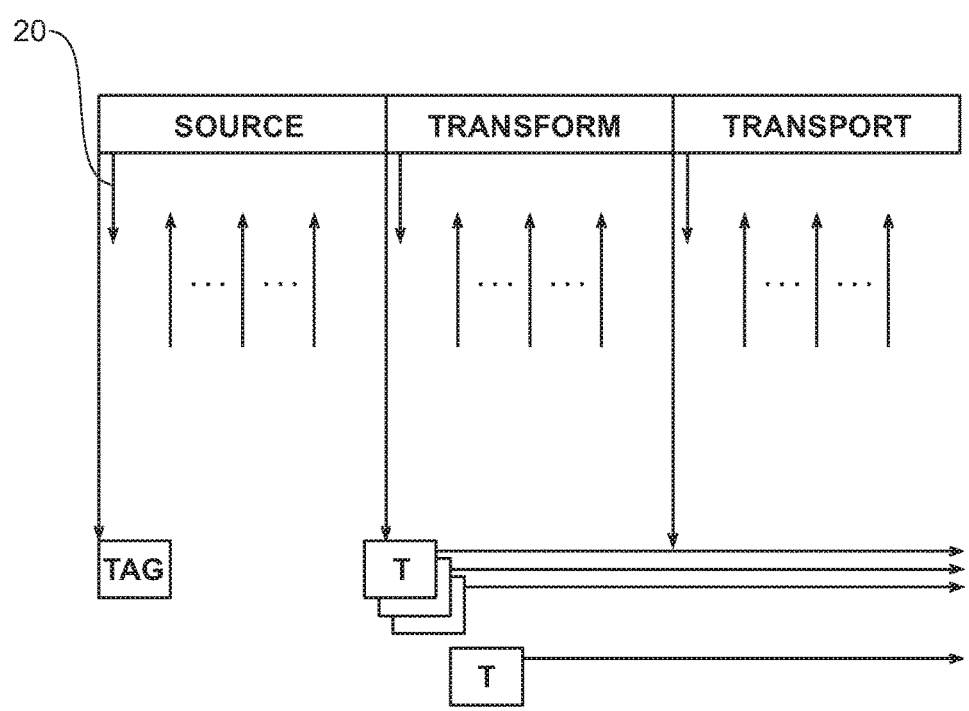
FIG. 2 depicts a pictorial representation of a time-line of the many steps and the collection of characteristics associated with those steps along a supply chain involving the use of a tag during the source phase and transformation phase and the supply of product code or codes from the processing server.

FIG. 2 illustrates another example of characteristic collection and recordal process which can include the detail of the actual capture of the tuna fish, but it could also be an example of a product that is not a perishable consumable, such as a source of marble suitable for sculpting. The value of such stone is very high and the origin is very important to the sculptor as well as the person or institution that has commissioned the works. In this example, the largest block possible is cut from the quarry of origin and for various reasons it is planned to be transported to a particular factory which specialises in cutting granite into particular shapes to suit the needs of various orders with minimal waste. Marble is but one example of such a product and another is fabric which is made in bulk but is then provided to tailors who partition the fabric further and create multiple clothing items, thus when the final clothing product is sold the provenance of the fabric it is made of can be of importance.

FIG. 2 illustrates that a unique identifier 20 is generated by the processing server ahead of time or at the time of cutting the large block of granite and associated with the large original piece either physically by the attachment of a tag (in one or more of its forms) as well as being associated with the processing severs record of that unique identity by way of communication from the quarry of origin. The tag is preferably readable/scannable so that it can be tracked more easily or there is a further readable/scannable tag attached to the slate block. At the time the quarrying take place there are various characteristics in existence or created and which can be associated by the processing server with the unique identifier, at the time of the creation of the block and those characteristics existing or created are communicated to the processing server or stored for later communication. For example the characteristics can be: the dimensions, the estimated weight, a quality score, the largest face dimension, etc.

There is, in this example of a granite piece product, a need for the granite piece to be transported to a suitable factory environment and details of those characteristics are also made available for recording or communication to the processing server. Once at the factory the process of creating multiple portions of the granite is begun and as each portion is created, each of them is allocated a unique identifier, which can be derived from the identifier of the piece from which the portion has been cut and then associated with the unique identifier at the processing server or created a new. Then each portion of granite can be associated with a tag 'T' which is also associated with the unique product identifier. There may also be a version of the unique identifier which is machine readable only, human readable only, or a combination, attached to the portion which will provide for ease of tracking during storage, before further transportation if being delivered to the location at which the portion is to be worked on. Thus, as the portion is handled during the transportation phase further characteristics are recorded and communicated to the processing server.

FIG. 2 could also be representative of the processes involved in the capture and portioning of the whole fish into portions for individual sale. It is a matter of choice whether to allocate an intermediate unique identifier for the portions and use associated tags. By way of example, each package is allocated a unique identifier, which can be derived from the unique identifier provided to the whole tuna, or created a new, and associated with the package, both physically as in a label generated at the time and also by communicating the identifier and package details to the processing server. The processing server may be used to create the label once one or more characteristics are made available to it, such as for example, the weight (tare and gross), packaging date, used by date, best by date, fish type, when packed, where, by whom, etc. The processing server may receive these characteristics after they are generated by a local computer device, in one example, the weighing machine and label printer combination or the local computer device and label printer can generate the product code, in one example, using an IPC coding scheme.

Figure 3:
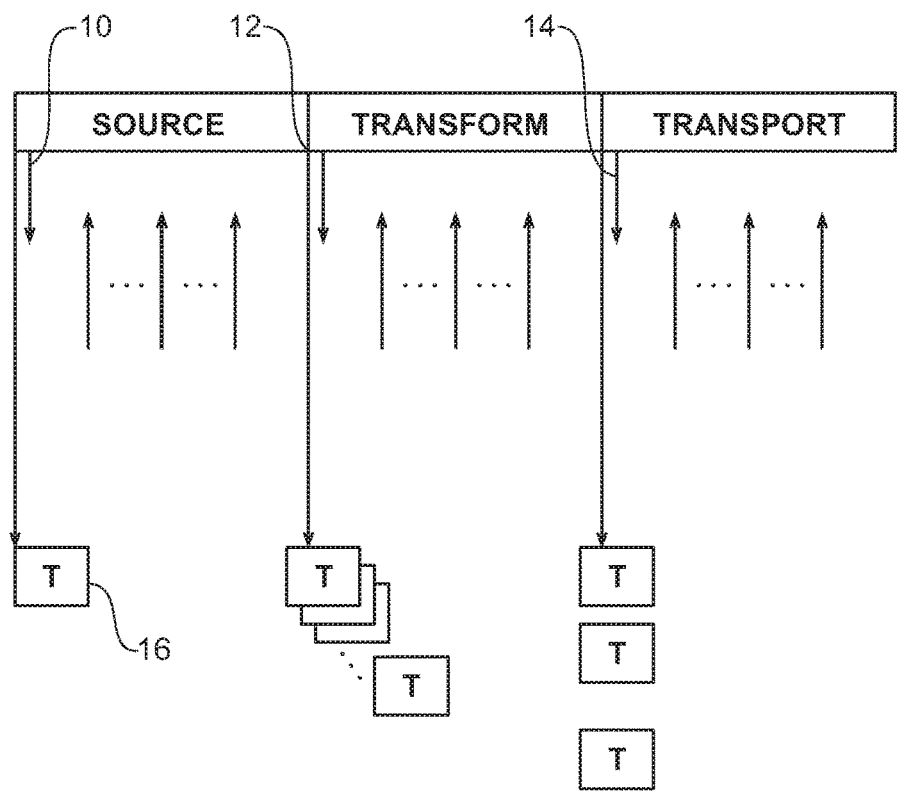
FIG. 3 depicts a pictorial representation of a time-line of the many steps and the collection of characteristics associated with those steps along a supply chain involving the use of a tag during the source, transformation and transportation phases and the supply of product code or codes from the processing server.

FIG. 3 illustrates that a unique identifier and tag/s can be provided in the same manner as described as for FIGS. 1 and 2, in addition to which it is possible to assign a further unique identifier and or attach tag/s, to individual packaged product for the transportation phase. The allocation and association in the memory device of the unique identifier at the time of final packaging into portions for sale direct to consumers is carried out either before transportation or in a facility suitable for such operations and transformations but generally located very close to the final point of sale. It is also possible to use unique identifiers for each of the final packages which comprise one or more earlier packaged goods as in a batch situation which is represented pictorially by the lesser quantity of tags to be associated with the final batched packaging, which contains tags for each of the prior packed and tagged portions of the source product. There is an association by the processing server in the associated data memory device of the unique identifier for a source version or any other version of the product with the unique identifier of the anti-counterfeit device. There can be associations by the processing server in the associated data memory device of multiple unique identifiers of multiple anti-counterfeiting devices.

The use of additional unique identifiers to the product or portions of the product occurs at selected steps of the progress of the product along the supply chain and the FIGS. 1 to 4 illustrate the provision of that identifier from the processing server which is illustrated by the downward pointing arrows 30, 32 and 34.

Figure 3A:
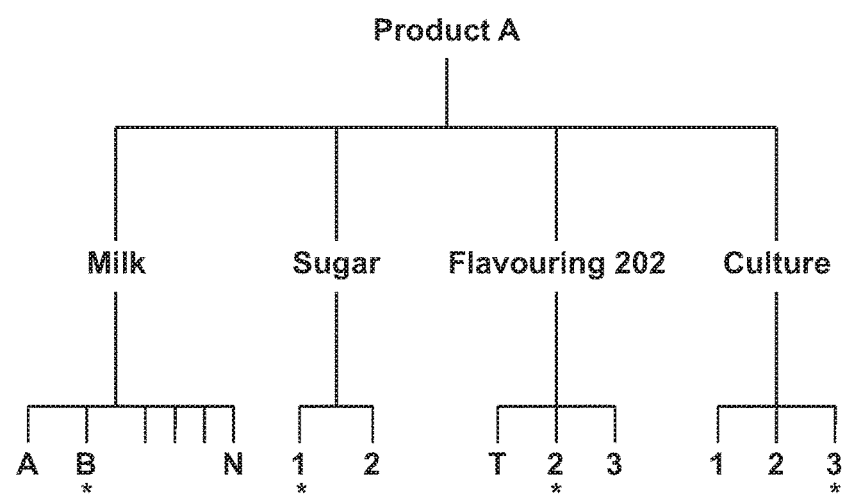
FIG. 3A is an illustration of a representative multi-level traceability tree.

FIG. 3A is illustrative of the multi-level traceability, which is dynamic, in that, by way of illustration, Product A has four ingredients: milk, sugar, flavouring and culture. As would be expected there will be multiple batches of those staple products as illustrated for milk, being batches A, B through to N; sugar, being batches 1 and 2; flavouring 202, being batches 1, 2 and 3; and culture, being batches 1, 2 and 3, wherein the particular product used milk batch B all of which was sourced from a dairy farm identified within the processing server (dairy farm 54 will be described in relation to FIG. 5), Sugar batch 1, which is sourced from a grower in Bundaberg Queensland for example, flavouring batch b sourced from additive factory ABC Limited and culture batch 3 sourced from culture grower XYZ Limited. This information being made available to any enquirer of the data held in the processing server which stores the data and which has all the required records of the specific ingredients and their sources.

Figure 4:
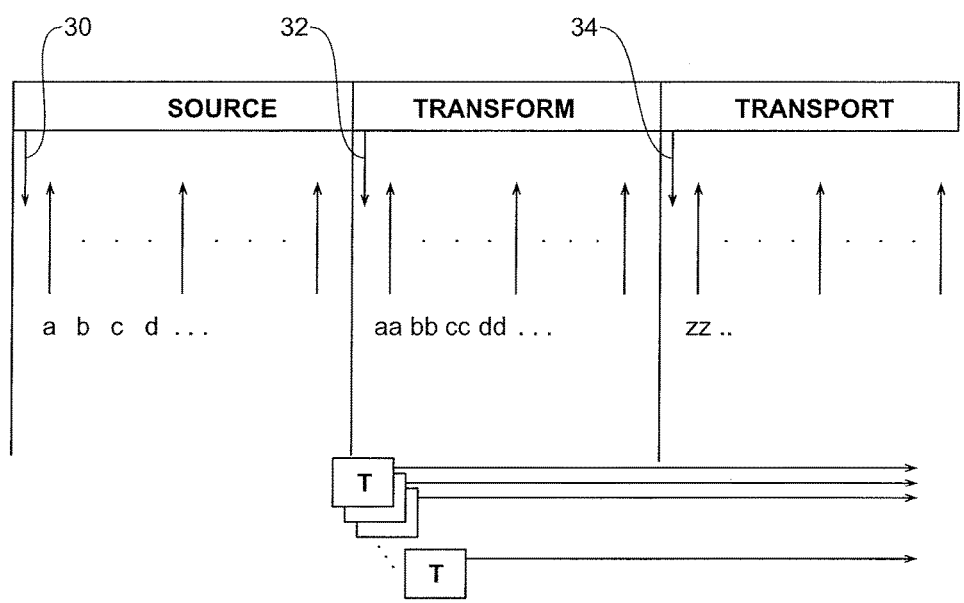
FIG. 4 depicts a pictorial representation of a time-line of the many steps and the collection of characteristics associated with those steps along a supply chain involving the use of a tag during the transformation phase and the supply of product code or codes from the processing server.

FIG. 4 illustrates the use of a tag during the transformation phase and as is illustrated, the tag remains with the product until it is purchased or consumed. However, the process of creating and attaching or associating a unique identifier to a product in many different ways can also occur. The recording and making available of one or more characteristics that are uniquely associated with the product is part of the basis for providing provenance information.

Figure 5:
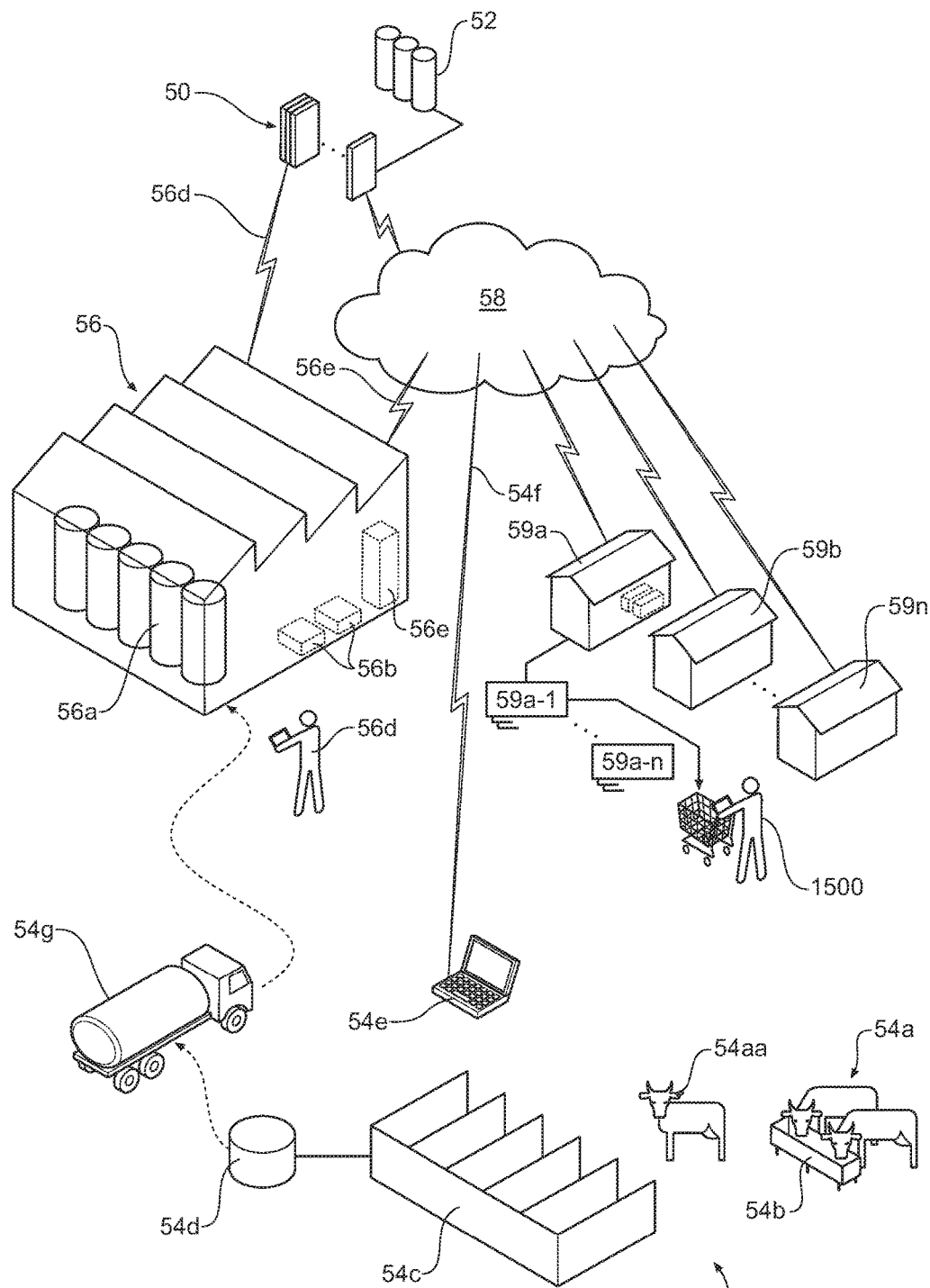
FIG. 5 depicts a pictorial representation of a use case involving a dairy farm, a factory for processing the source product and outlets for various forms of the transformed product/s, a purchaser's cart, the Internet as an example of the communications mechanism and network and the processing server and associated memory.

FIG. 5 is illustrative of a particular environment that can include system elements and personnel that can use the processing server 50 to implement the system that provides one or more of the aspects disclosed in this specification. In an embodiment there is at least a central processing unit and associated local memory device that makes up the processing server 50 and a data memory device which stores data, the configuration of processing server is arranged specifically, but not restricted to, receive, make available, and process data representative of characteristics of products; generate, issue and receive unique identifiers; receiving by the server and storage in the data memory device of one or more characteristics of the product existing or created during the source phase of the product; associate and facilitate the recording into a memory store of multiple unique identifiers, and associated characteristics; association by the processing server in the data memory device the unique identifier of the source version of the product with each of one or more characteristics of the product existing or created during the source and other phases of the product; association by the processing server in the data memory device the unique identifier of the source version of the product with each of one or more characteristics of the product existing or created during the source and other phases of the product; association by the processing server in the data memory device the unique identifier of the source version of the product with each of one or more characteristics of the product existing or created during the source and other phases of the product; receiving by the processor of the unique identifier of anti-counterfeit device with a query for the provenance of the source version of the product associated with the anti-counterfeiting device; making available by the processor in response to the query of at least one characteristic associated with the source version of the product by using the unique identifier for the source version of the product to locate in the data memory device one or more of the characteristics of the product associated with the source version of the product or to retrieve from the data memory device, collate and present the characteristics associated with the unique identifier and providing those characteristics with none or additional data which further informs the recipient of the information including provision of data associated with one or more unique identifiers of tags which have been physically associated with a product or product portion or packaging.

In this embodiment, dairy farm 54 has a quantity of cows 54a of a particular breed and a known pedigree. The feed the cows consume is known feed 54b which is recorded and associated with each cow in the herd as the individual animals are tagged 54aa (typically a RFID tag) which has stored therein a unique identification for that animal and which is detected by devices located, for example besides the feed trough 54b. The dairy farm collects and maintains information associated with each cow. The system that performs those data collection tasks is well known. It may also be possible for the tags associated with each animal to collect information, for example, the health of the animal, the temperature, the hours of grazing and sleeping, etc. The milk is collected and stored in tank 54d in desired conditions and the actual conditions are recorded, as are other characteristics recorded and stored in computer device 54e at least temporally and transferred 54f to the processing server 50, possibly via the collection of computer networks referred to as the Internet 58.

The farm system can in one example generate a product identifier in one form, a bar code which uniquely identifies the content of the tank 54d and supplies that as a bar code for attaching to a tanker 54g manifest of picked-up milk, or the tanker driver scans the bar code as part of the pick-up routine and that data and one or more characteristics are stored for later communication to the processing server. Some examples of characteristics include: the time and date of pick-up, the outside temperature at the time of pick-up, the temperature of the milk just picked-up, etc. and during the transport process, additional characteristics are recorded and eventually made available to the processing server. As the bulk milk is added to the larger tank 56a at the factory 56 the recording of this data can be achieved in many ways, in this example, the factory personnel 56c scan (using handheld device 56d) the tagged information into the factory data processing system 56e.

Each contribution of source milk into the common tank 56a is recorded as being part of a batch of source milk product. It is a possible for a further unique identifier to be allocated to the batch by the factory as one of a number of identifiers that were previously generated by the processing server 50 and made available as required and it is possible for the factory data processing system 56e to generate a unique identifier. Since the factory is likely to be the brand owner for the milk and milk products that are destined for the consumer market and retail shelves, it is very likely that the factory will create the unique identifier with its own unique code portion incorporated into the unique identifier which will be carried through to the unique identifier that will be readable from the label incorporated with the final product. The format of the unique identifier can be in accordance with GS1 or another suitable unique identifier system.

There could be multiple sources of milk in the tank 56a which is substantially larger than the tank 54d and tanker 54g so there may be multiple sources of milk product in the tank 56a all having their own unique identification so the new unique identifier may incorporate those other unique identifiers or there is an association of the prior unique identifiers' with the newest unique identifier. The association occurring, in one example, at the factory 56 and advised to the processing server 50, or in the processing server as and when that processing server is communicated to (receives) the relevant data via direct link/s 56d or via computer 56e and the Internet 58 or any other suitable computer network/s.

The processing server 50 illustrated in FIG. 5 is only a pictorial representation of hardware and software which supports the functionality that has been described and will be described in more detail in this specification. The actual configuration of hardware and functionality of the software is directed specifically to the performance of the steps described, however, there will be aspects of the configuration which are well known since they exist to interface with other well-known systems, and an example of which, is the provision of a data gateway to the Internet (on which a large proportion of the data exchange between the processing server and the other parts of the supply chain occurs). More about the processing server will be described later in the specification.

The factory 56 could produce many different products 56b and if the source is the milk from the identified tank 56a the source's unique identifier is associated with each product made from that particular source. The association can be made by the processing server 50, it could be made by devices located at the factory which are also arranged to collect and record one or more characteristics associated with the processed products 56b (cheese, yogurt, butter, etc.), for example, the temperature, the type of product, the weight (tare and gross), the packaging type, the ingredients of the product where there is more than just a processed source product, etc. Depending on the value of the product and other factors, such as the importance of being able to ensure the non-counterfeiting of the individual product, it may be reasonable to a fix a tag to the individual product during or at the end of the transformation phase of the supply chain, as is pictorially represented in FIG. 3, which also depicts the use of one or more anti-counterfeit tags for use on packs/pallets/containers of prior packaged product but such a step is a additional step.

FIG. 5 also depicts multiple outlets 59a to 59n which may or may not further transform source product. By way of example, the receipt of bulk milk product may have been pasteurised by a process performed in the factory 56, where the now transformed source product 56b can then be used by the in-house cheese maker at 59a to create multiple cheese portions for direct sale to the public. In this example, each cheese product 59a-1 to 59a-n will be marked or have a label or price indicator associated with each final product that will include a product identifier, which will be traceable to the batch of source milk, transformed milk in the delivery tanker (not shown) which in turn can be traced to the tank 65a and further traced back to the dairy farm 54, and the tank 54d contents, and if need be back to the cows that contributed the milk. Associated with the tracking information there are many characteristics which can also be provided since they have been collected and collated by, in this example, the process server 50 and maintained in memory 52.

The multiple outlets 59a to 59n are representative of many types of businesses, for example, the outlet may have a local Business to Commerce (B2C) focus meaning that the output is destined to other local businesses, where the output being cheese is supplied to a retail grocery outlet; by way of another example, the outlet may have International B2B focus meaning that the output is destined for a business located overseas, where the output being cheese is supplied, for example, in refrigerated containers overnight to a Hong Kong wholesaler of specialty cheeses; by way of another example the outlet may have a Business to electronic Commerce Business focus meaning that the output is sold direct to consumers via an Internet based shopping platform which promotes and sells the cheese to consumers who prefer to purchase without visiting a physical shop; the outlet may have a local Business to Business (B2B) focus meaning that the output is destined to be sold other local businesses, where the output being cheese is supplied to a grocery wholesale outlet; by way of another example, the outlet may have local B2B focus meaning that the output is destined for a business located locally, where the output being cheese is supplied in refrigerated containers to a local wholesaler of specialty cheeses.

Also depicted in FIG. 5 is a shopping trolley which contains a purchased cheese product 59a-1 associated with which is a label or price indicator which includes a product identifier, which will be traceable to the batch of transformed source milk into cheese, and the transformed milk in the delivery tanker (not shown) which in turn can be traced to the tank 65a and further traced back to the dairy farm 54 and the tank 54d contents and if need be back to the cows that contributed the milk. Associated with the tracking information there are many characteristics which can also be made available since they have been collected and collated by, in this example, the process server and maintained in memory 52 until requested. More will be described about the request for information and the provision of that information later in the specification.

The product 59a-1 may also have an anti-counterfeit tag associated with it and for some consumers or representatives of those consumers, it is important that they are able to check to determine if the product is a genuine one and to learn from and observe the information which is associated with the provenance of that product. The following description is applicable to the scenario described but it is also applicable to many other products (even those products which are the origin product or that have one or more transformation steps, or one or more transportation steps) that are important enough or valuable enough to have a product code and in particular an anti-counterfeiting tag associated with them.

FIG. 5 also depicts a device 1500 which is described in greater detail later in the specification when describing FIGS. 15 and 16. The device 1500 can have dual functions, but may only be configured for one of them, or is switchable between them.

In one embodiment the first function of the device 1500 is to detect, in one example method, by detecting/scanning the unique identification associated with the product, to assist in the determination of the associated provenance of the product. Such as for example, the origins and the history of the product, based on information obtained, for example, from the processing server (or other servers as will be described and which was briefly mentioned previously). The term detecting is used to describe any function of hardware and software that receives information from the product or its packaging that can be interpreted as an identification of that product. Thus by way of example but not intended to be limiting, is the use of machine readable code, which will require, in one example, a bar code scanner wherein the hardware is a optical input that transforms the received optical patterns from a label into a software recognised digital code, which could be a GS1 code or an IPC code. Another type of code which can be scanned from the product is a two dimensional scanning arrangement called a Quick Response (QR) code. The scanner may detect other optical or physical characteristics embedded or attached to or imprinted in connection with the product representative of the unique identifier associated with the product. It is also possible to detect radio frequencies from a passive circuit located within the tag which when transformed represent a unique identification of the product.

In one example, the product has associated with it, a one dimensional bar code that uses the GS1 coding scheme. The device 1500 may be able to scan that code, but if not the device can be paired using a low power wireless communication mechanism, or it can communicate with a mobile computer device, most generally a mobile phone device, that has an optical code reception function typically using the camera of the mobile phone device, compatible with the sensing of the optically represented GS1 code, to permit the detection, transformation and interpretation of the unique identification of that product.

The device 1500 or a suitably programmed mobile computing device (tablet, portable computer, etc.) or mobile phone device, can then communicate via the Internet 58 to the processing server 50 to obtain information about the product as well as information about the provenance of the product, assuming the product is what it indicated in the received information. More will be described about the extent of information provided but it would suffice in most cases to provide, but to the relevant device, data to create human readable information that allows the person scanning the product to confirm that the product information is descriptive of the actual product that was scanned.

The device may also have the ability to detect/sense an anti-counterfeiting device attached or associated with the product (that may involve in some products that device being inside the product) to confirm the authenticity of the product to which it is associated. More will be described about this functionality later in the specification. The sensing of the anti-counterfeiting device will be optional since in many situations the consumer will rely on the scanning of a bar code or QR code or other type of scan for the unique identification. However, in the case of a wholesaler, receiving a batch of product or individual product, it will be imperative to establish unequivocally that the product is a genuine product and in some cases that the packaging has not been tampered with. It is also possible for the generally more expensive anti-counterfeiting detection/sensing device to be made available to consumers in a retail environment, so that each product having an anti-counterfeiting tag associated there with can be checked, at or before, sale. It is also possible for the anti-counterfeiting device to be abandoned when the source version of the product is further processed. Abandonment of a tag/anti-counterfeiting device can happen at other steps of the supply chain, such as just before joining of a product to another but usually not before there is a checking of the veracity of the tag/device with an appropriate reader/scanner.

Figure 5A:
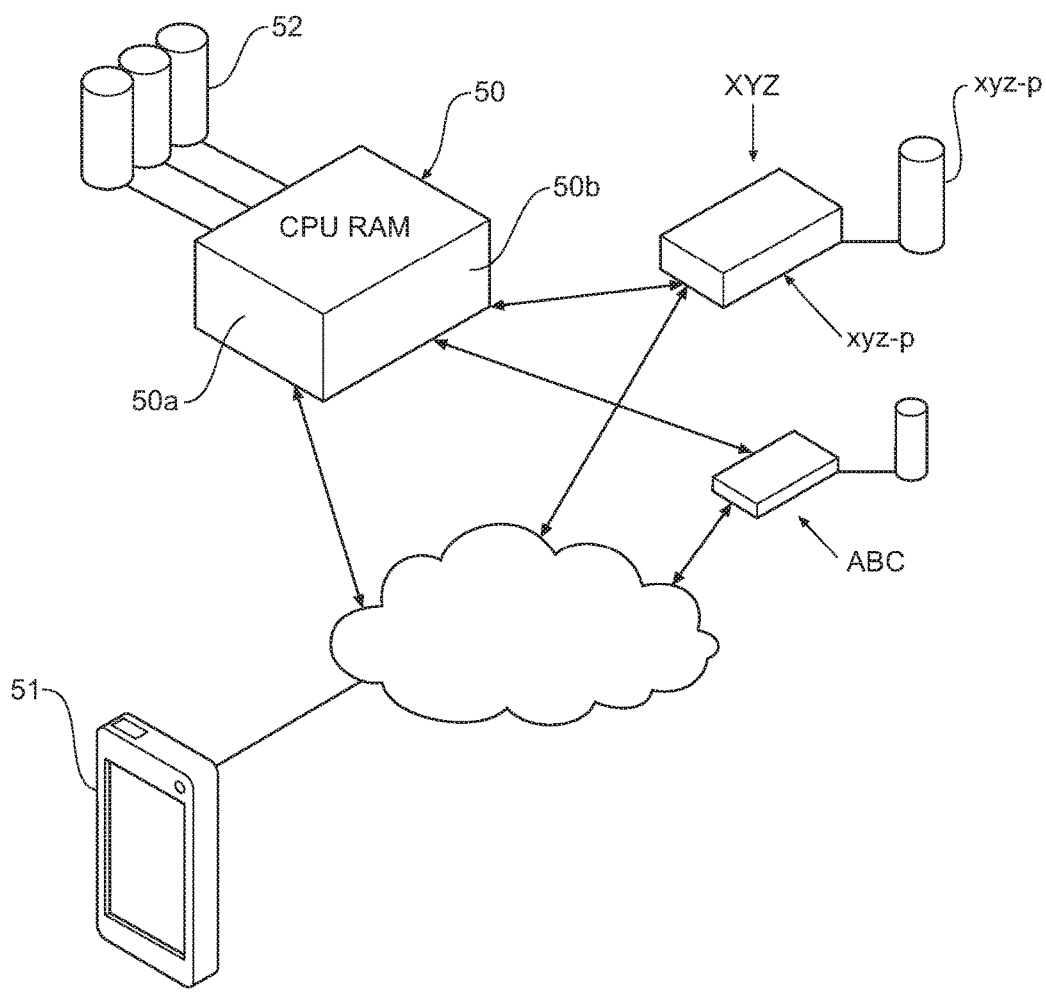
FIG. 5A depicts an alternative information server arrangement.

FIG. 5A illustrates, at a very high level, an example configuration of information servers, including the processing server 50. In an embodiment, the processing server has stored in a data memory device and collated in that device all the characteristics it has received and associated with the one or more unique identifications of the product since the time there became a source product. The processing server can generate a unique packaging identifier for each package version of a portioned source product. The processing server can associate in the data memory device the unique packaging identifier with a respective packaged version of the product. There may be application of further anti-counterfeit devices each having a unique characteristic to each packaged version of the source product. The steps of association are a process performed by the processing server central processing unit and local memory to generate a data string under the control of a database management program which stores a pointer in a table which can be referred to each time one or the other data is read or copied or even changed. The pointer or pointers created by the program indicate logically where respective data is stored in a physical address in the data memory device and the nature of the association. There are numerous tables to be updated to ensure that the associations are kept up to date and are representative of the relationship between the two data in linked lists and tree structures of data. There are one-to-one associations, one-to-many and many-to-one associations as well. A database program organizes its database/s as a series of files. These files are mapped and pre-formatted into so-called areas. The areas are subdivided into pages which correspond to physical partitions on the disk. The database records are stored within these partitions. There are numerous methods for storing data in a database, including but not an exhaustive list, direct, sequential, relational, calculated, random, etc. There are also numerous hierarchies of the relevance and priority of the data which are implemented by the database program. The ease of recordal (storing) and retrieval (reading) of the data is determined by many factors including but not exclusively the database program language, the data structures used, the speed of the physical devices (hardware of the central processing unit/s, the hard drives, solid state drives, etc.). The server receives and stores in the data memory device one or more characteristics of the packaged product existing or created during the portioning of the source product (which is but one example of the receiving step).

Data is made available to a users' code reading device 51 from the processing server in response to an appropriately formatted and authorised query sent from the device 51. The query can consist in one embodiment as a HyperText Markup Language (HTML) created within a browser used on a computer device used by the user, or generated by a computer device at run time or a pre-programmed time. The query format will need to define the data requested as being associated with the unique identifier for the packaged version of the product or the unique identifier of the further or other anti-counterfeiting device to locate in the data memory device one or more of the characteristics of the product associated with the packaged product.

Figure 19:
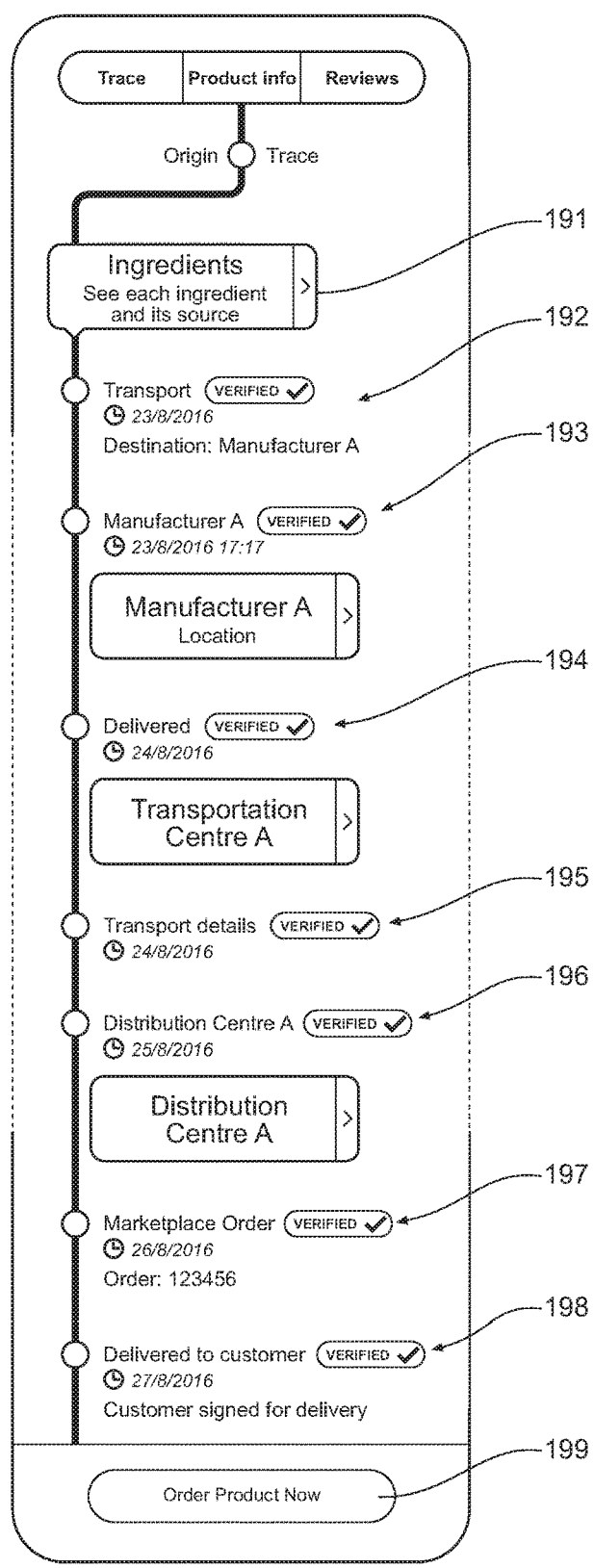
FIG. 19 depicts product information made available to the user of the device.
Figure 20:
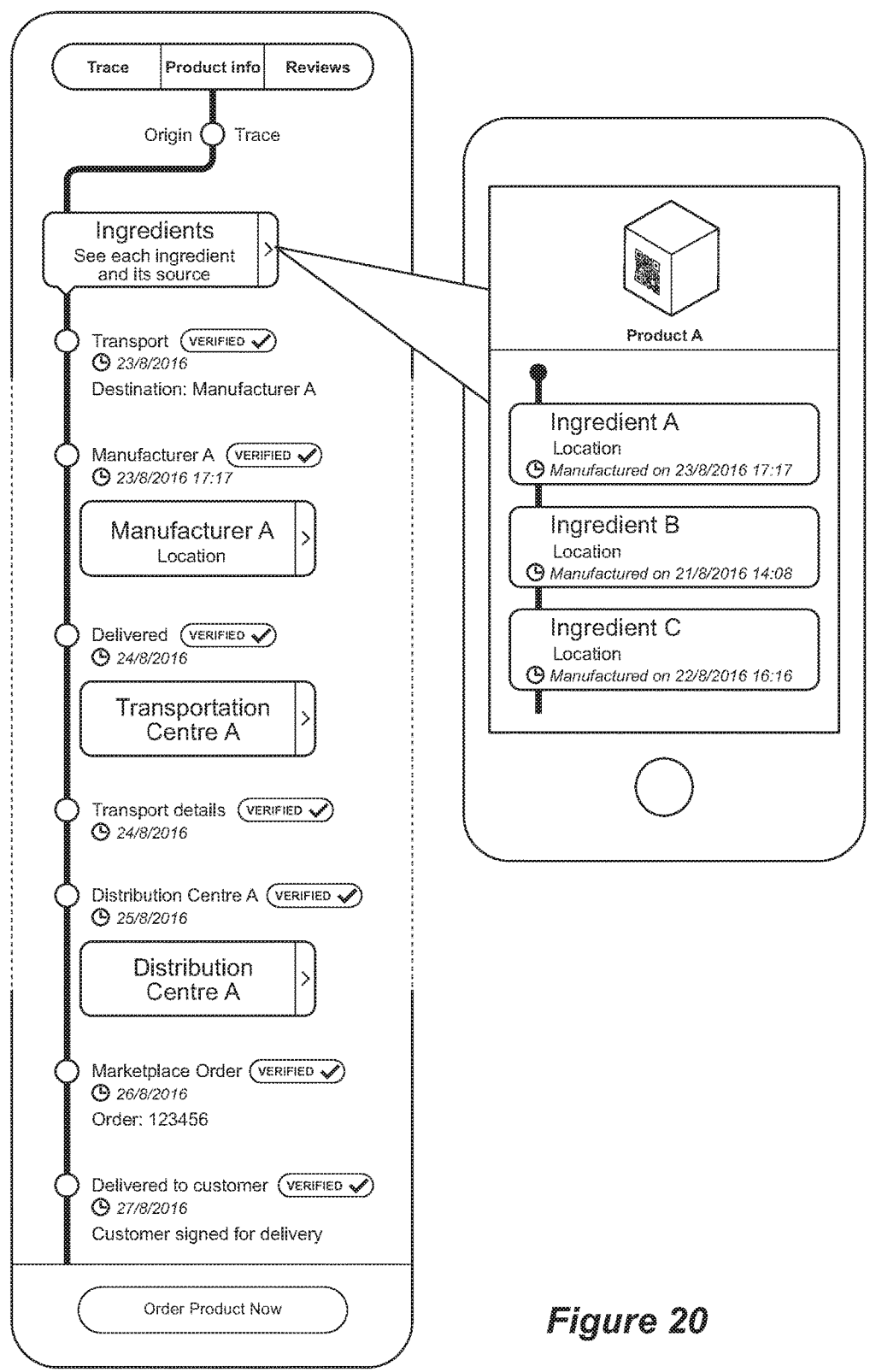
FIG. 20 depicts a list of the ingredients made available to the user of the device.
Figure 21:
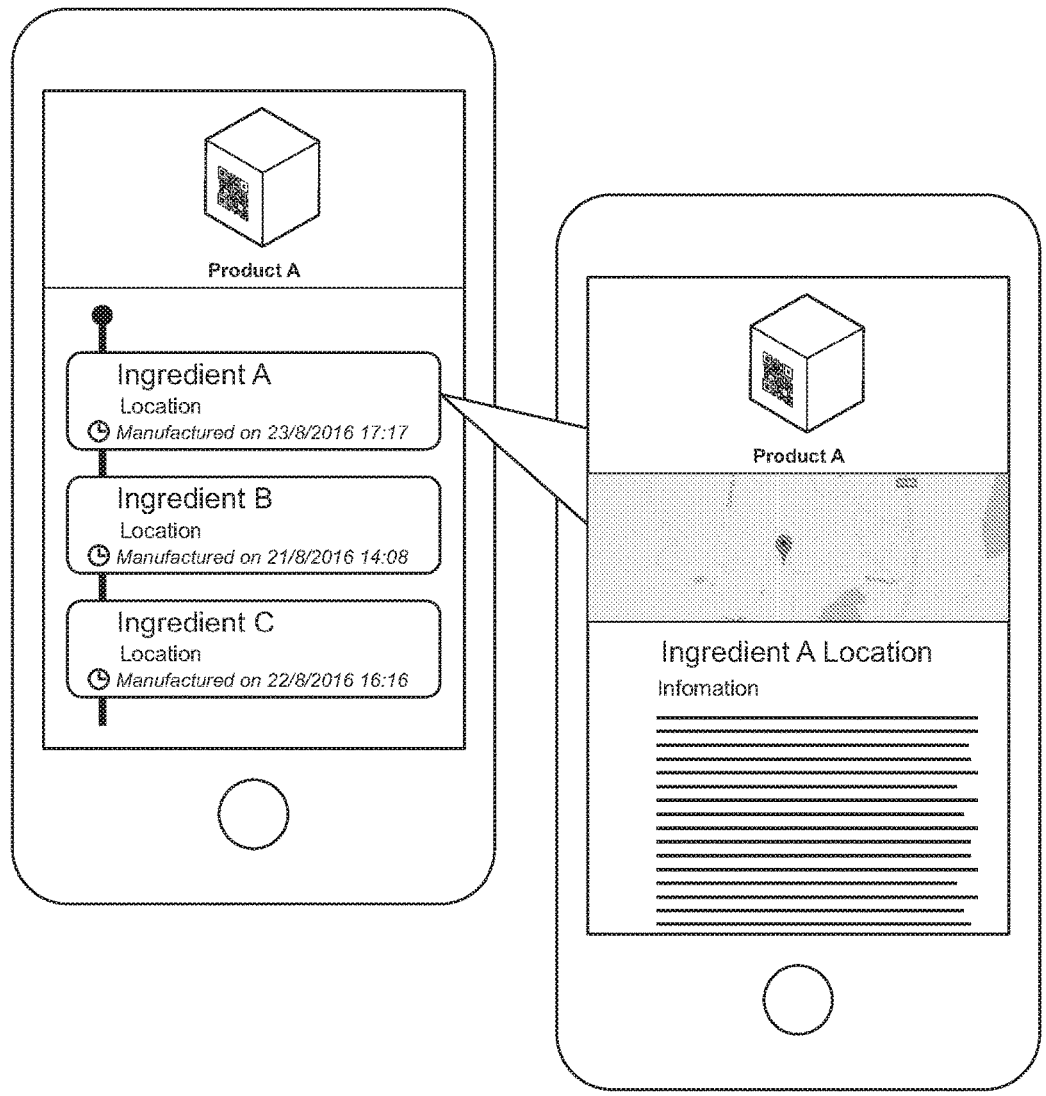
FIG. 21 depicts information relating to the manufacturer of an ingredient.

Such an arrangement can be handled by the processing server when there are tens of products but depending on the scalability of the processing server it may be reasonable to share the processing load or divest itself of that load altogether. The making available of data is achieved by the operation of the central processing unit, the local memory and the program controlling their operation to read the respective data using the associations created with pointers obtained from the data structures described and providing that data to a data output. There are numerous formats that the data can be provided, by way of example, the format can be in HTML which is adapted to be communicated using Internet Protocol (IP) of one or more versions destined for the display of the formatted data on a user computing device, such as for example, a browser operating on the computer device, commonly a mobile phone with one of more IP communication mechanisms, FIGS. 19 to 21 are illustrative of the displayed version of the data. In another example, the data is formatted to be made available to a database program such as Excel and the format is .csv which is adapted to be displayed to the user and can be in a manner illustrated in FIG. 12.

It will be appreciated that the processing server receives and collates a large amount of data for association with the many hundreds/thousands/hundreds of thousands of product codes it has generated and/or are tracking, as they accumulate numerous characteristics of each individual product and its associated code/s along the supply chain.

In the case of hundreds or thousands or hundreds of thousands of products and associated data in the memory 52 which is associated with the processing server 50, it is a reasonable restriction that the processing server off load the servicing of the types of queries mentioned above. FIG. 5a depicts multiple external servers (some virtualised versions of a server on one physical server), that may be associated with entiles which own particular brands that wish to have a copy of the characteristics of each unique product bearing their brand, as well as a coded form of the unique product identifier. In such a case the owners of the brand may provide separate processing servers to deal with such queries from purchasers of their branded products. The processing and memory capacity can be dynamically shared between processing servers and memory banks located in multiple locations for security and load balancing reasons as well.

In the example associated with FIG. 5, the factory 56 is owned by a corporation XYZ which owns the brand XYZ for the dairy product 59a-1 and the processing server XYZ (includes processor xyz-p and memory xyz-m) as illustrated in FIG. 5a. The processing server 50 provides a copy of the product 59a-a information (including each unique identifier and its set of characteristics) so that queries for that information can be supplied to the consumer or purchaser as the case may be, at any stage of the supply chain process, and when the identification code is scanned/detected or sensed by a suitable device. More details about the presentation of that information will be described later in the specification.

FIG. 5a depicts another corporate processing server and memory arrangement for entity ABC so that the ABC Corporation can serve information about its products based on information supplied by the processing server 50 and its associated memory 52.

Figure 6:
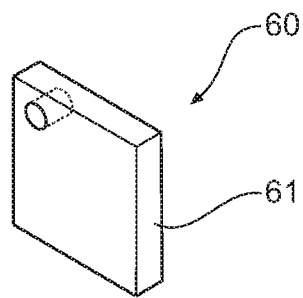
FIG. 6 depicts a representation of one form of a tag.
Figure 6A:
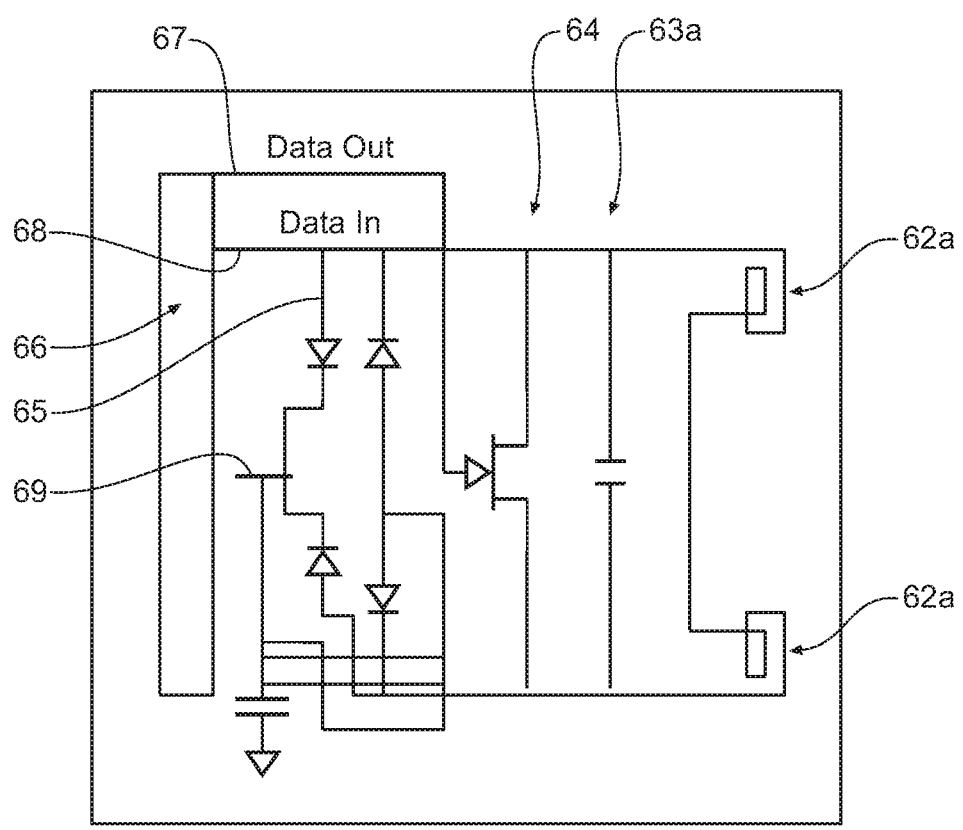
FIG. 6A depicts a representation of the circuit of the tag depicted in FIG. 6.

FIG. 6 depicts a physical tag 60 having housing 61 and internal to the housing there is device electronics (illustrated in FIG. 6A). The illustration of a rectilinear tag 60 is illustrative of one type of tag which because of its size, weight, configuration and robustness will be suitable of a small quantity of products at a small number of stages of the supply chain. Various other configurations and types of tags will be suitable for other or similar products at various stages of the supply chain the form factor of those tags being too numerous to illustrate but the choice of which tag is to be used with which product will be readily made.

FIG. 6A illustrates a circuit for the tag 60 illustrated in FIG. 6. The circuit is merely illustrative of an RFID type tag which derives power from an Electromagnetic radiation transmitted from a transmitter. There is an associated reader device to receive an electromagnetic retransmitted signal from the tag. The tag does not have an internal battery or other power supply, so the received alternating in polarity electromagnetic energy is received by the antennas 62a and 62b and current is derived from the antennas and stored for a short period, such that the stored current provides an electric power source used to drive the processor 66 to output predetermined code which at least includes the unique product identifier that has been stored in the processor circuitry having a non-volatile memory portion or an associated external non-volatile memory (not shown). The workings of RFID tags vary greatly so the description provided is very generic, as is the circuit disclosed, but the principles are much the same between tags of this type. The use of an RFID tag is optional as there are many other types of tags, some which include power, and some that require proximity with a transmitter and reader to work, others that derive power from external sources such as sunlight or even stray electromagnetic energy, or which self-generate power by movement, or temperature change, etc.

Some of the types of anti-counterfeiting devices used in association with product or produce, may include one or more of the following:

Data Dot technology which has the form of an extremely small (just visible to the human eye or assisted human eye observation) which is constructed to contain a unique identifier that can be sensed at any future time even thought the product is incorporated into the product or produce, while it under goes many transformative process, uses in other products or encounters many environments during collection, transformation or transportation. Once the data dot is sensed and the imbedded information/data therein is read (that data being for example a reference to the unique identifier of that data containing dot itself) and then the associated product code can be determined from a register of such information.

An Optically Variable Device (OVD) is an example of another technology that is useable in the arrangements described in this specification. An OVD produces two quite different optical images depending on the angle it is viewed at. One of the main features of the technology is that it can reproduce photo-quality portraiture and have a positive/negative image flip effect. It can produce graphic effects with colours that switch on and off, and super high resolution micrographic effects. The technology is highly flexible and can incorporate images and designs chosen by the user. Such technology can be incorporated into paper and other carriers which themselves are the product or are associated with the product. The images are meant for visible inspection but there are types of this technology that incorporate non-visible characteristics as well.

Anti-counterfeit technology may be of a form and factor so that is can be used as a seal for the product, it may form part of the product, it may be in a part of a multipart product which is located and arranged in such a way that the remainder of the product cannot be replaced without disturbing the anti-counterfeiting device.

Another type of anti-counterfeiting technology is referred to as spectrum fingerprint technology. The method of this technology includes fabrication, transfer and validation via image processing nano-fibre-based, unique security marks ('nanotags') for anti-counterfeiting purposes. Epitaxial surface growth of oligophenylenes on a heated muscovite mica crystal results in a thin film of mutually aligned nano-fibres with dimensions of tens of nanometres in height, hundreds of nanometres in width and tens to hundreds of micrometres in length. By applying a shadow mask, a film pattern is generated which contains only sparse, randomly grown nano-fibres, which in turn represent a unique 'fingerprint' of the growth area. This fingerprint can be transferred on an adhesive tape as a label of a product, imaged using low magnification microscopy, digitalised and stored in a database. Infrared surface heating, enforced cooling and load lock transfer makes the fabrication process fast and scalable to mass production.

Each anti-counterfeit device has a unique identifier created typically at the time of manufacture. There are numerous formats of the identifier and the important feature is that it not changeable under any circumstances and even if the identifier is attempted to be changed that tampering will be evident. For the purposes of representation of the unique identifier for use in the processing server a data string can be generated by numerous methods, one of which is the use of mathematical hash of determined strength incorporating one or more characteristics of the anti-counterfeit device and possibly an external characteristic such as the time of day, a physical immutable characteristic of the packaging of the device, etc. thus the hash value generated can be represented as (typically a 64 character long data string of HEX value digits—a digest) which can then be treated like any other data string in the database. The data string is a one way representation meaning that only exactly the same inputs will generate the exact same digest but knowing the digest can never be used to determine the inputs.

In one example, a device which is used to check the authenticity of the anti-counterfeit device associated with a product can be very expensive, mainly because the device itself needs to be tamperproof, the technology for the tamper-proof anti-counterfeit device can sometime require very specialised sensor construction and set-up. In one example, multiple singular and bands of electromagnetic and non-visible frequencies which need to be detected and transformed into identification signals, require accurate detection and discrimination, repeatability and reliability, hence the cost of this portion of the anti-counterfeiting device can be high relative to some other forms of anti-counterfeiting devices.

The expense of such anti-counterfeiting devices may mean that they are only used by personnel at locations dealing with large product volumes, such as with a wholesaler; or where there are large volumes of consumer sales. Regardless of where they are used they can be used in conjunction with the provenance determination mechanisms described herein and a register of their locations can be made available so that consumers can use them to check the authenticity of the product they purchase.

Figure 7:
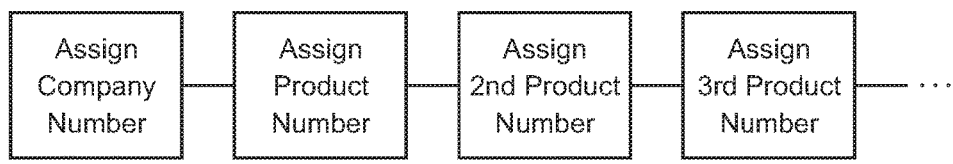
FIG. 7 depicts a flow diagram of the product code assignment process.

FIG. 7 illustrates a step in the process of generating or allocating a product number. The first part of a unique product number includes, in this embodiment, a series of identifier characters which represent an entity, in most cases the company that owns the brand that will be associated with the product that is sold in commerce, and the unique identifier characters are assigned using one of a quantity of number symbology's or data carriers used in the particular industry (by way of example, a Universal Product Code (UPC)) representative of the product, and which may also be representative of the company, and most importantly a unique code for that particular product at that particular stage of the supply chain. In some alternative arrangements the UPC and sometime the unique product identifier are only created for a particular system, and thus only used in a closed company environment. The step of assigning the company number is made according to the needs of the provenance system but company number may also be varied or added to depending on the actual company purchasing/licensing the right to the company identification code. As long as those codes are traceable within the system.

As described previously, there are a number of times during the product cycle that a unique product code may be assigned. FIG. 7 is merely representative, in that it depicts multiple assignments which will coincide with the multiple times such an assignment occurs during the illustrated supply chain steps, but the illustrated approach may not apply to all steps or all products. The steps that require the step of the creation or assignment of a unique product code assignment are determined by the processing server or as required by the organisation handling the product during a particular phase of the supply chain.

Figure 7A:
FIG. 7A depicts a digital representation of a product code and an example bar code.

FIG. 7A depicts an example data string representative of the company identifier and its representation as a bar code and includes other data as well.

Figure 7B:
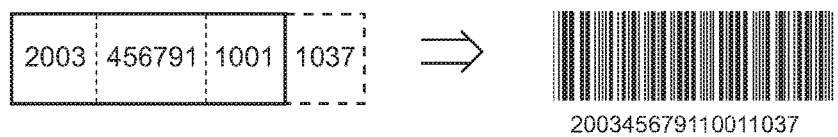
FIG. 7B depicts a digital representation of a further product code and an example bar code including the additional bars.

FIG. 7B depicts a data string representative of the company identifier plus a product identifier and is represented as a bar code. The bar code may be restricted in size (i.e. the number of bars) so there will need to be in some cases, a creation of a new code and requisite storage in the memory 52 associated with the processing server 50 of FIGS. 5 and 5A, of a list to concord all related product identifiers with the newly allocated product identifiers. Depending on the ability to store or display product identifiers on the individual product, it may be that they are all available from the product. In most examples, there will be a need to maintain a concordance list in an accessible processing server or servers and associated memory devices.

Figure 8:
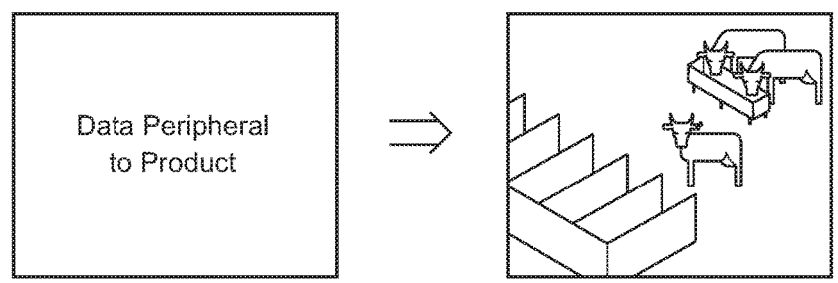
FIG. 8 depicts an example of additional information that can be provided to users and purchasers.

FIG. 8 is illustrative of the data which is sensed by the appropriate device by, in one example, reading of a bar code displayed in association with a product, which may be in accordance with the above described example bar codes, and thus includes not only the code of the company that is responsible for the product's quality, etc. but also a unique identifier of the product. The processing server can arrange for the storage of that data and for using the stored data to check the details against the product at stages of the supply chain. With that type of information, the processing server can retrieve (following a query) information associated with that particular product code and other information, a sample of that information being depicted in FIG. 8, as a picture of the dairy farm and descriptive text made available from the processing server and its associated memory for viewing and reading by people checking data along the supply chain, wholesalers being delivered product, and the final purchaser of that particular product.

Figure 9:
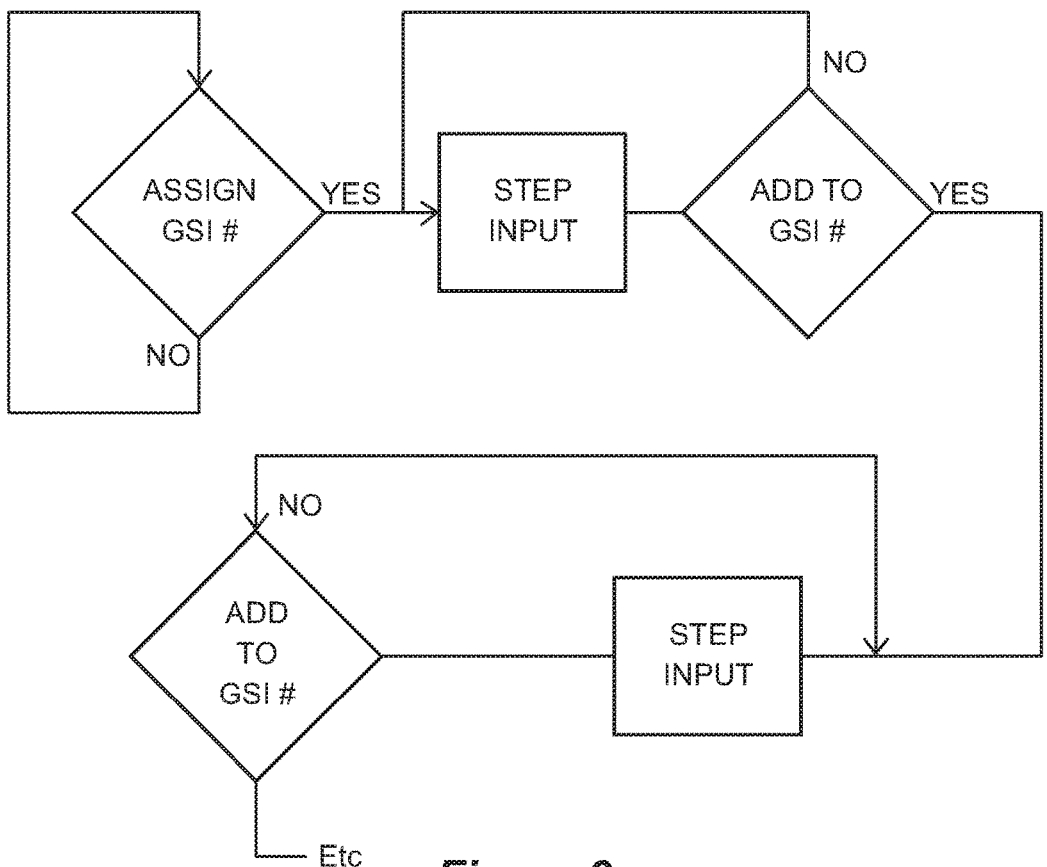
FIG. 9 depicts a flow diagram of the process of allocating one or more unique product codes.

FIG. 9 is a flow diagram of the process of assigning unique product identifications to products which thus become an identifier of the product. There are numerous ways in which unique identifiers can be created from strings of data and in one embodiment the unique aspect of the product identifier is comprised of the company identifier which is unique and a product identifier code which is combined with company code to provide a unique identifier. It may be that only one of the codes in a total product identifier is unique but then the combination will be unique, although possibly not as useful in an environment where there are large numbers of product. One method for creating unique and strong totally irreversible identifier codes is to use a mathematical one-way hash on a collection of data, such as for example, the producer code, the date, time and a random number to generate a 64 bit long hex coded string, or other output hash value. This process creates a data string which cannot be deconstructed into the input data used to generate the string, thus it will uniquely represent the input data. A change of the input data, say a different time by even a second while the rest of the data remains the same, will generate a completely different data string.

FIG. 9 is a flow diagram of the steps involved and operates, as a series of loops where if the processing server is tasked to create a product identifier code, it does so accounting for the step involved actually needing to be associated with a new product identifier. So it will be, that the first step of assigning a company identifier is premised on the prior assignment of a company number (for example using the GS1 numbering system) in a required data format and that the first step of handling the product during the source phase is to capture, harvest, mine, separate, culture, etc. the source product, and thus the need to assign a product number to that portion or unit of product. Therefore, as depicted in FIG. 9, the addition of a further GS1 type number takes place and the YES path is followed. There may then be one or more steps where the hierarchy of the numbering system requires a predetermined approach to product numbering that does not require the allocation of a new product number at a particular step, so the No decision path is followed by the process, repeating until a new number is required. Once a step, such as for example, the portioning of the product takes place, there will be a need, as identified by the hierarchy, to assign a new product number to each portion, although a step of assigning each portion a GS1 determined product number is not depicted in FIG. 9, it is one of the possible outcomes once a step requiring assignment has been performed.

Figure 10:
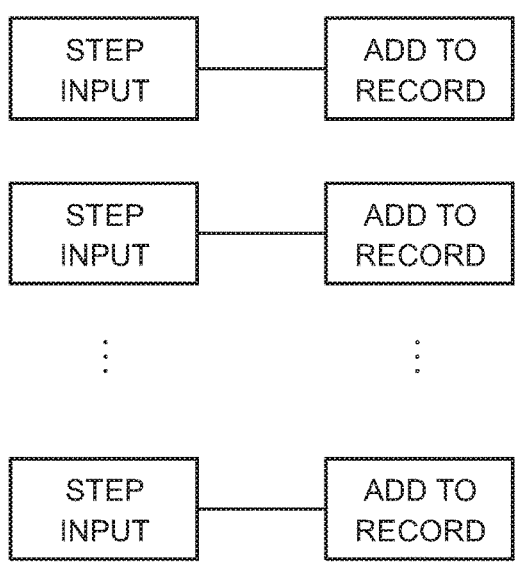
FIG. 10 depicts a step to record process.

FIG. 10 illustrates that each multiple step along the supply chain or of the transformation phase, may require data representing a characteristic to be added to the record of an associated product number code. As described earlier in relation to FIGS. 1 to 4, not all possible steps in the product chain will be considered as requiring data representative of a characteristic to be collected or stored. One such step, by way of example, that may not be required to be recorded, is the movement of a temperature controlled container from one truck to another. The critical characteristic in this illustrative example is the total travel time of the container, so the fact that it takes two trucks to complete the transportation of the associated product is not important, even though it is a step along the supply chain. An example of a step that is recorded as requiring recordal of data representative of a characteristic, in an example, is the step of packaging a portion of the product where the time and place of packaging are two such characteristics to be recorded.

Figure 11:
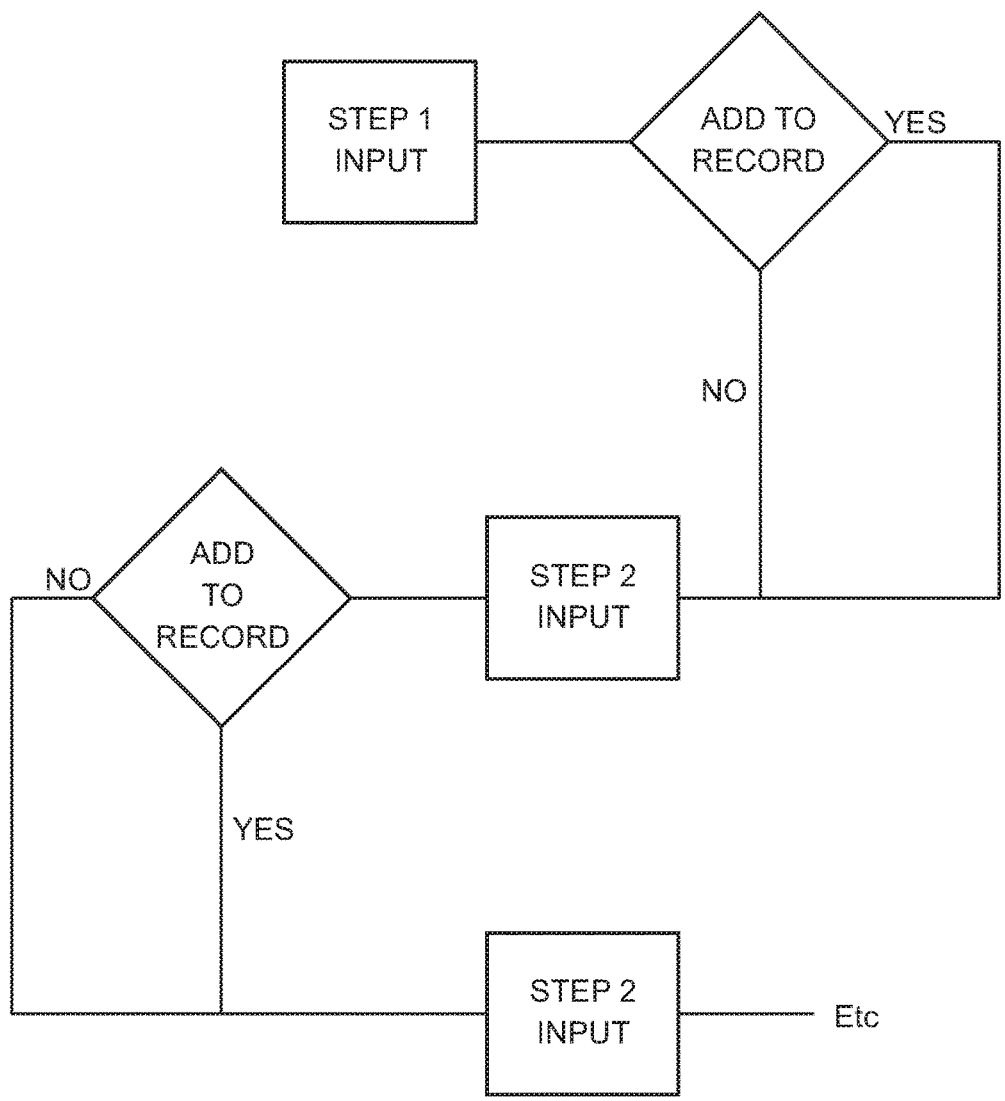
FIG. 11 depicts a flow diagram of a process of deciding which steps to record and which not to record one or more characteristics.

FIG. 11 is a pictorial representation of the description provided for FIG. 10.

FIG. 12 is a pictorial representation of one embodiment of the arrangement to record (in memory 52 (or at least in an intermediary memory before transfer to the memory 52) the traced records of the movement of a product through the supply chain. The rows and columns of a data set are pictorially presented which contains data representative of various characteristics a, b, c, . . . , aa, ab, . . . zy, zz . . . of a product #1 aligned against the various steps that were allocated a particular product identification. Thus for product #1 that was first allocated product id#1 has three characteristics a, b and c. Product #1 with product id#2 has three characteristics d, e and f, etc. An array of records for each of the products 1, 2, 3 to m are created and maintained. The record is simplistically represented by FIG. 12 but the array of data is, in one example, kept as part of digital database. In one example, the Microsoft SQL relational database is usable to control and make available the relevant set of data but there are many other databases that could be used, such as a Relational Database Management System (RDBMS), one of which by way of example is the SAP product or service.

Figure 13:
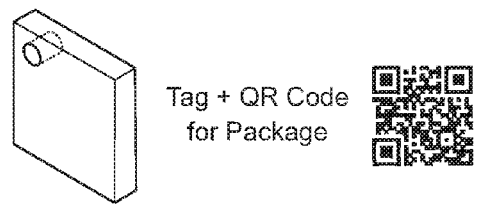
FIG. 13 depicts a tag and QR code.

FIG. 13 illustrates a tag and QR code combination used or useable in association with a product. In this example the tag 130 is secreted within the package and not visible to the purchaser of the product, while the QR code is printed on the side of the package and visible as well as scannable. The QR code can be scanned with a device as described in conjunction with the description of FIG. 15 and may also be used in conjunction with a computer device that can communicate to the processing server 50 to have the product confirmed as the product it should be within the package as well as provide characteristic information and optionally additional information. Note that a QR code is but one way by which the unique product identification can be represented on the package. For example it could be a bar code or two-dimensional code, etc.

Figure 14:
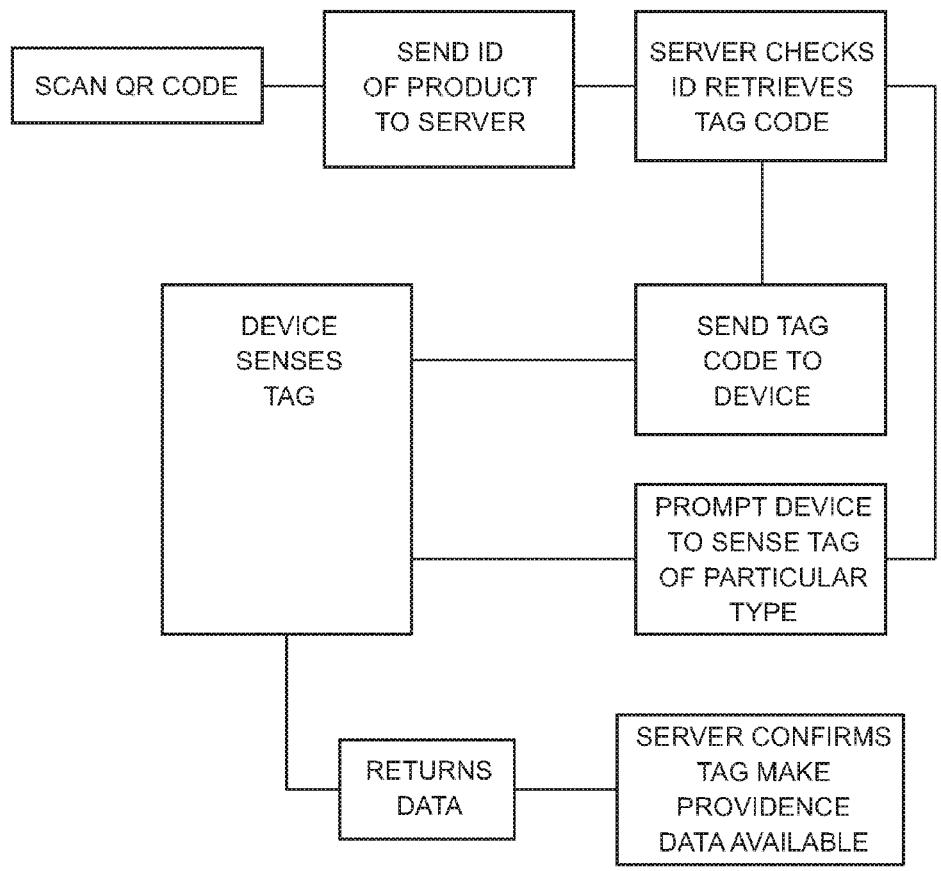
FIG. 14 depicts a flow chart of the process of interaction with a product code displayed as a QR code and the tag associated with product.

FIG. 14 is a flow diagram representative of the result of the step of scanning 1402 the QR code which is representative of the unique product code for the packaged product and in response to the sending of that code to the processing server 50 and associated memory 52 to then be provided certain information back about the tag within the package. A representation of the product code is sent to the processing server which checks that the product code is recorded and if so retrieves a tag code which is associated with the product. These are two options disclosed but they are not the only options possible.

In a first option, a tag code is provided to the enquiring device and if that device is capable, or is associated in some way to a device which is capable, of sensing the tag, then the tag code is sensed and data is sent back to the processing server to confirm the authenticity of the tag and thus the product that is in the packaging.

In a second option the processing server having received the product identification prompts the device to sense the particular type of tag (as described previously there are many types of tags and associated coding within the tag), so the processing sever sends a prompt to the device to use that information to sense the particular tag. Once the device has sensed the tag it may be able to confirm the authenticity of the tag without a further response to the processing server. In that case a signal to the user of the device is used to signify the authenticity of the tag and its unique association with the product. An example of such a signal is the illumination/powering of a light emitting diode (led) 1602 of the tag reader device illustrate in FIG. 16, connected to the sensing circuit of the device in such a manner that it will only alight in a predetermined colour if the sensing device determines the authenticity. Additionally, in another embodiment, the same led will alight in a different colour (also predetermined) if there is no authentication of the tag. This arrangement is only one of many such arrangements which will signal the authenticity or lack of authenticity in a verified way, such as would be the case in a trusted computer environment.

Yet further, as an alternative, the device 1500 may return certain data to the processing server 50 which is compared with data that the processing server has access to in memory 52, which in turn, if the match is true, confirms that the tag is a legitimate tag and associated with the product within the package, and being returned to the device in a secure manner such that the veracity of that signal is maintained and assuredly signalled to the user of the device.

In both options the information and additional information provided by the processing sever 50 will provide a basis for the purchaser/consumer to have a belief in the provenance of the product.

The device 1500 used to sense the tag 130 can have many possible configurations. There will however likely be at least a central processing unit 1502, a local cache memory 1504, and possibly long term non-volatile memory (not displayed), and a user interface 1506 (hardware and software based) and an output interface 1508 (hardware and software based) as depicted in FIG. 15. There are at least two other sensing arrangements, in this embodiment there is provided a sensor A, as depicted in FIG. 15, which is of the type to sense a QR code. In one example, the QR code sensor is a camera lens A' (as depicted if FIG. 16) located over a light sensitive diode array (not depicted in FIG. 16 but part of A of FIG. 15) which transforms light and reflected light into electrical signals which are then interpreted by software (stored in long term memory and temporarily while being executed in the short term memory), to convert the dark and light array representing the QR code into a string of data, that is typically representative of a Universal Resource Locator (URL) being a web page address. The web page address is used to reference the processing server 50 via the internet which contains code to deal with the query from the device and make a query to the relational data base in the memory 52 for the relevant characteristic data and additional information.

Figure 15:
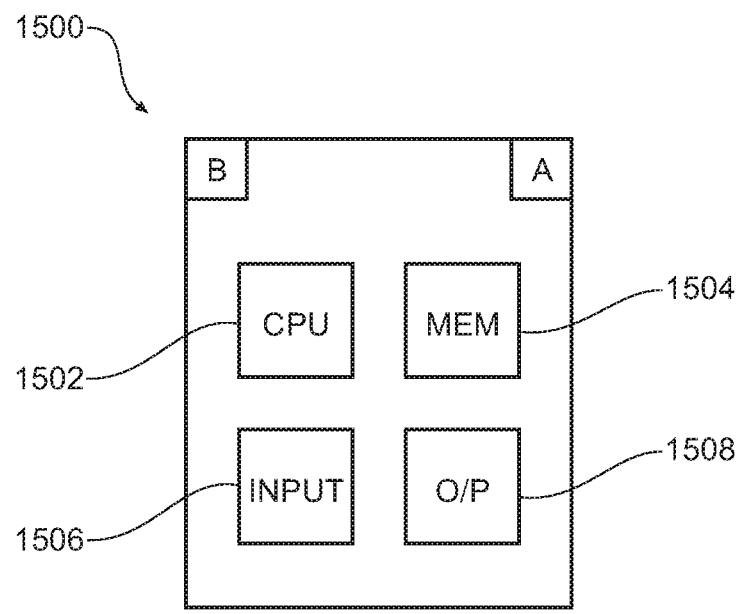
FIG. 15 depicts a basic configuration of the working elements of a product code reader.

The device 1500 as depicted in FIG. 15 is used to sense the product code (in one example a QR is used to display the code or a data string which represents the product code or an address in a computer network in the form of a URL) and also when presented a tag 130. The device can also be the device to display received information or may be paired to a device which is capable of receiving and/or displaying information. The display of a representation of the information which makes up the characteristics of the product can be of many types, and in one example, the information is displayed as multiple types of media. In one version of the displayed information, one or more steps and associated characteristics are displayed on a visual display portion 1602 (as depicted in FIG. 16) of the device 1500 using lines and colour and images representative of the information 1604 in conjunction with text and figures to represent numerical characteristics. There are numerous possible ways to make the information interesting and readily understood by users and purchasers. It would not be unusual for the type of information displayed and the way in which it is displayed to be done in a way that best suits the needs of the observer.

The device 1500 as depicted in FIG. 15 is used in conjunction with the digital data memory 1504 having stored therein a digital representation of expected characteristics for at least a first sensed input of one sensor A and a second sensed input of another sensor B. There are in the example illustrated, two sensors each sensor adapted for receiving a different sensed input, each sensed input having one or more characteristics. There may however be more than the two sensors so that a range of different unique identifiers can be used on the product, package, storage containers, pallets, transportation and the various sensors will be usable to detect/scan those identifiers.

The CPU processor 1502 is used for comparing sensed inputs of sensors to the expected characteristics for sensed inputs stored in the digital data memory 1504. The receipt of a first sensed input by a respective sensor A by exposure to the product and confirmation by the processor of a match to at least one of the expected characteristics stored in memory, prompts communication using the communication mechanism (not shown) of a representation of the product to the computer system. The communications mechanism can be by way of example a telecommunications arrangement that effectively connects the device to the Internet and in this example to the processing server arrangement described in detail in this specification. In another example of a communication mechanism there may be a WiFi arrangement configured to communication to a wireless router and onto the processing server arrangement. A multitude of communication mechanisms are available to suit the device and its use.

The provenance information is made available by the processing server and receipt by the communication mechanism of the device 1500 of respective provenance information prompts to the user the exposure of a second anti-counterfeiting device associated with the product to receive a second unique identifier as a second sensed input by a respective sensor B. The sensed input is confirmed by the processor 1502 working with the internal memory 1504 of a match to at least one of the expected characteristics of the anti-counterfeiting device, which confirms the provenance of the product and is indicated to the user of the device using the visual display 1602 depicted in FIG. 16.

Thus by way of example, a purchaser of a block of granite will want pictures of the source quarry, chemical analysis of the source granite, and representation of the size and weight of the portion that has been purchased. They may also want to know the modes of transportation used to move the portion of granite to the place of purchase.

In the example of a block of cheese the purchaser will want to have displayed a graph of the temperature of the source milk when stored and transported until the milk was transformed into cheese, they may also wish to know the storage period of the cheese block and in what conditions. They will likely already know the type of cheese and wish to also know the yeast culture used to start the cheese making process.

In the example of the whole tuna fish the purchaser may wish to be provided the catch location, date of capture, vessel, the storage conditions from the time of capture to the presentation of the whole tuna fish, the composition of the brine in which the whole fish was washed and maintained.

Figure 17:
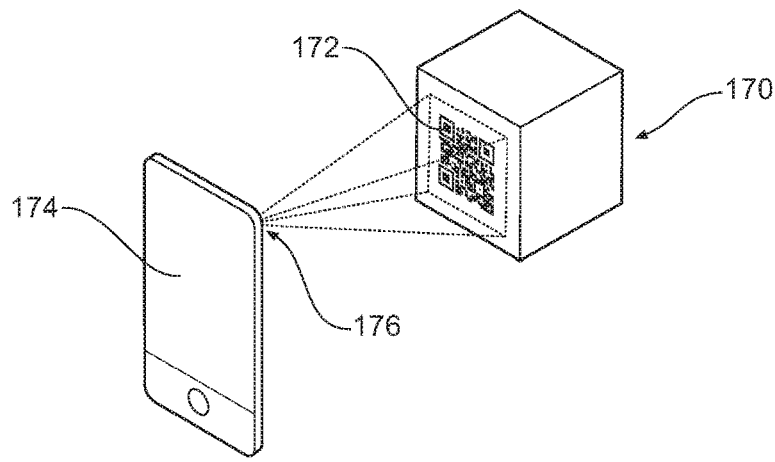
FIG. 17 depicts a packaged product having thereon a 2-dimensional code thereon.

FIG. 17 depicts a packaged product 170 having thereon a 2-dimensional code 172 (for example a QR code). In the operation of this arrangement of codes and tags it is possible to vary the types of codes, the physical presentation of those codes and the manner in which the tags are incorporated into, on and associated with the respective product. Equally, there just as many ways to detect and determine those codes and tags. At one level of means to trace a product and thus be informed of the provenance of a respective product can be enabled with the use of everyday devices, such as a handled computer device 174 the most common of which is mobile phone device, which incorporates into the housing multiple computer devices, multiple communication mechanisms, and multiple sensors (one of which in this embodiment is a camera 176) for detecting and interpreting multiple physical characteristics. In the embodiment described the computer device has a computer program installed and invoked. Such a program is referred to as an application. In the embodiment the application controls the use of the camera and the image it captures is the code and the program either contains the code to interpret the code or a third party program is used to interpret the code.

The code in this embodiment is representative of the address of a unique file accessible using the internet to access that file (for example a Universal Resource Locator URL). The unique file is unique because the file is a reference point to data unique associated with the same product with which the code is associated. The use of a processing server located anywhere which has access to all the characteristics collected along the supply chain for that product a code allows the processing server and the handheld computer device to work together to present one or more of those characteristics in a convenient and informative way to the user of the device and purchaser or even a prospective purchaser of the particular product.

Figure 18:
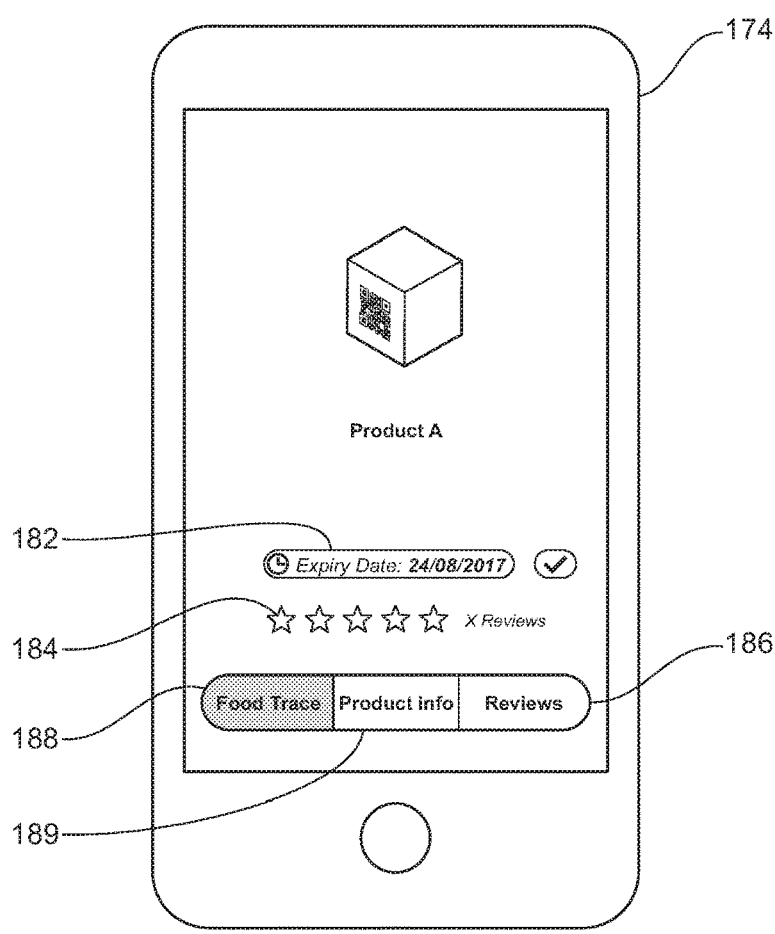
FIG. 18 depicts a mobile computer device which is capable of presenting one or more characteristics of a product and provides for the user of the mobile device to interact with the presentation.

FIG. 18 depicts a mobile computer device 174 which is capable of presenting one or more characteristics of a product and provides for the user of the mobile device to interact with the presentation. The device could however be a dedicated device which includes a processor, memory and input and output elements and respective sensors to allow a user to initiate a code interrogation of a product in its vicinity so that the respective sensor can detect the unique code associated with that particular product and present the various characteristics of that particular product. The form factor of the device could be hand held, portable, or associated with a free standing device located in a shopping center or warehouse. FIG. 18 depicts a user readable screen of information including in this embodiment a representation 180 of the product 170 (since although it is possible an actual picture of the packaged product could be included in the characteristics, it is likely in most cases that a representation will suffice). The display of various characteristics is a matter of choice and in this embodiment the display is used to provide the most relevant information to the user of the device. Thus, the image includes the Expiry Date 182 for the actual product 170. The display in this embodiment includes a rating indicator 184 so that the user can be encouraged or otherwise to purchase based on the ratings of the product line by others. In this embodiment a star rating level is made visible and it is possible to click through to the one or more reviews 186 provided about the product line. The rating index and reviews are collected, collated and stored in a server arrangement which may or may not be the same processing server which controls the making available of the various actual product characteristics.

Further characteristic are made available to the user of the computer device through buttons which initiate a linking of the device to a respective file. So in the case of the user wanting to know more about the actual product associated with the unique code, the FOOD TRACE button 188 (being a virtual button displayed on a visual display element which is also capable of interacting with the touch of the user). Other buttons are made available in this embodiment, being PRODUCT INFORMATION 189 and REVIEWS 186.

FIG. 19 is illustrative of the PRODUCT INFORMATION made available to the user of the device. The display area of the device is not always capable of allowing for all the respective information to be displayed at the same time, so the illustration uses dotted lines along the periphery of the available product information to indicate those portions that are hidden until brought into the visible display area, in one embodiment by scrolling the display.

The display of the PRODUCT INFORMATION begins with an option button to investigate the Ingredients 191 of the actual product that is being offered for sale. This option is notable since a common list of ingredients consists of each ingredients name only. As will be disclosed in relation to FIG. 20 each ingredient that was used in the creation of the actual product is listed as well as the source of that ingredient.

The actual date of transportation of the final ingredient to the Manufacturer's location on 23 Aug. 2016 is indicated by the Verified symbol that date and associated action took place when it is indicted to have. The verification process can vary for each action but in this embodiment the action of a delivery track drop off was logged by a scan of a code associated with the respective ingredient at the time of drop off and then the inclusion of the ingredient into a product verifies the use of the ingredient in the next step of the supply chain. There could be other ways of providing verification, including the use of two scans of a product ingredient, one at the unloading bay by the delivery driver and then a separate scan of the product ingredient by the receiving clerk of the item into storage.

In another embodiment of the process of verification can be provided by using an external process of recordal of the characteristic that is unalterable without detection. In an embodiment but not necessarily the only method for providing this feature, is the use of blockchain technology to maintain a public record of one or more of the data associated with each characteristic for each product.

Blockchain technology relies on a combination of many nodes being servers and associated data memory storage physically and logically separated from each other, physically maintained by independent actors. The more blockchain nodes the better as each node is intended to control a collection of the same information, virtually simultaneously, and exchanged securely between each node. The 'same information' has a special meaning in blockchain technology in that if a record is created according to the, to be discussed, method of block creation and maintenance, then that record is inviolable, in that, if one record in a single blockchain server and memory combination is changed in anyway then, the fact that it is different from all the other records on all of the other independently maintained blockchain servers, will be readily identified.

The record is in fact a block of data, in the main every block is not only a record of the data fed into the system it is also inextricably associated with the previous block, or record. That is because every block contains a one-way hash of the previous block. Each block in the chain also uses the time and date as part of the record so that the creation of that block can be compared to the creation of all other of the same blocks. Therefore, a chain of blocks, by definition is a record that cannot be changed without the links being changed/broken. Thus in one example of the use of blockchain technology, Bitcoins (a uniquely created and unique digital entity that has value), wherein every Bitcoin has a block in which its owner is identifiable, each block/Bitcoin cannot be spent twice, since each transaction with a particular Bitcoin is recorded and each transaction changes the owner, and therefore once a change of ownership of a Bitcoin is recorded the blockchain technology does not allow that same Bitcoin to be transferred to two owners since the legitimate blockchain includes the legitimate owner. However, a blockchain is only as good as its links to previous records/block in the same blockchain. A role of a blockchain can therefore be the unequivocal validator of transactions, each peer/node can proceed and trust one another because the rules of trust, compliance, authority, governance and the distributed nature of the arrangement.

For completeness it is sometimes possible because of differences in the time of the generation of a block in a blockchain that the time is different when it is received by a blockchain server and thus a "fork" is created, where there is effectively only one block which remains the only block, since as the remainder of the blocks all have the same time characteristic, then further blocks create an extension to those same earlier blocks and they will dominate and become the main blockchain. The blocks that fork from the main blockchain are not used and are referred to as orphan blocks. It is not possible to link them to any other blockchain.

The security and independence of the data contained in a block is therefore ensured and there should never be a duplicate record of the data that cannot be detected and thus in an embodiment of the application of the blockchain technology to the provenance of a product it is possible to verify each of the multitude of characteristics of a product as it moves along the supply chain.

In the application of blockchain technology to the disclosure herein there is a need to apply a secure/secret encryption to the data to be recorded as it is transferred between the processing server 2200 and a local or remote node 2220 in the blockchain network 2208 to 2218. There can be different types of encoding. In an example, there could be use of a symmetric code, consisting of a secret key known only to the processing server and a node to which the data record to become the next block is sent by that processing server. The node will use a received record to add to a particular block chain, which is dedicated to a very particular product and its respective product identifier. The known encryption key and respective encryption algorithm applied to the data that makes up the record at the time of creation of the block in the processing server. In that case although the record contains a great deal of information, that information will not be available to be viewed or analysed after it is sent from the processing server until it is decrypted by the node receiving it using the same known key and the respective decryption algorithm. That is each block is available to be viewed in each node but while it is encrypted during transit from the server to the node and whenever the server queries the node to determine the content of a particular block within a determined block chain associated with a particular product the communication of the data record is encrypted and decrypted using that same known key and thus an interceptor of the communications cannot view the record or change the record. This arrangement will work but key transfer and key management amongst all the relevant nodes is an issue with non-trivial solutions.

Figure 22:
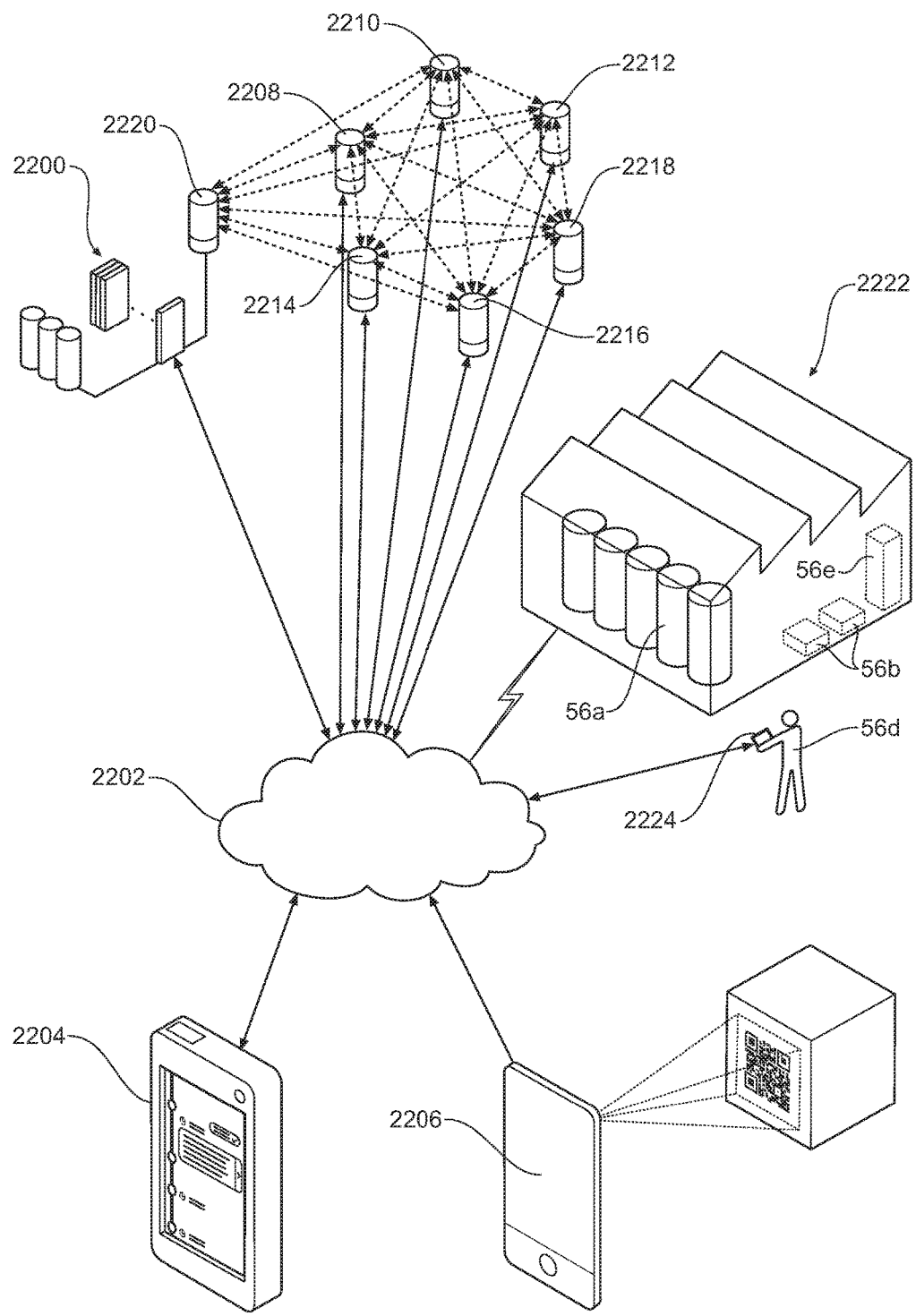
FIG. 22 depicts a processing server much like the processing server and data memory devices of FIG. 5.

FIG. 22 does not provide an illustration of a feature described previously, being the encryption by the processing server of data sent to the node and the decryption by the processing server of data received back from a node, whether that is the local node or a physically remote node. In a further embodiment, it is possible to use an asymmetric (sometimes referred to a public key) cryptography mechanism which is any cryptographic system that uses pairs of keys. The Public Key can be provided to users/purchasers/prospective purchasers to check the authenticity of a block accessible at any node where the private key is used to encrypt the block created by the processing server. This type of encryption and decryption does two things of benefit to the arrangement. The first feature is that although the blockchain is a peer to peer arrangement and the network autonomously maintains the system, it is a public system in that all the data is kept multiple times within the multiple nodes, thus, to maintain the confidentiality of the record it is possible to encrypt with the public key (i.e. by the processing server) and allow only those devices that have the private key (computer devices, mobile phones with a suitable application, etc.) to decrypt the record obtained from a particular block to thus verify the existence of the relevant data in the record, such as for example, the anti-counterfeit device associated with a fish at the time of capture. The use of an asymmetric cryptography can also ensure that that validation is conducted without allowing plain text to be viewed by anyone other than the user of the receiving device, possibly though after some local processing to display the data in a human friendly manner, since the transmission of the data is encrypted, whether that encryption and decryption is done with another private/public pair or a dedicated secret key, or there is use of the Hyper Text Transport Protocol Secure (HTTP over SSL or HTTP Secure) is the use of Secure Socket Layer (SSL) or Transport Layer Security (TLS) as a sublayer under regular HTTP application layering. HTTPS encrypts and decrypts user page requests as well as the pages that are returned by the Web server including all the data transported.

In an embodiment illustrated in FIG. 22 there is depicted a processing server 2200 much like the processing server 50 and data memory devices 52 (FIG. 5) described previously which contains a database, as described elsewhere, containing data representative of the various characteristics of the product and various associations with one or more unique product identifiers and anti-counterfeiting devices unique identifiers. The characteristics are stored in the database as data representative of events and information associated with a product as it traverses the supply chain, as described elsewhere. The internet is depicted as cloud 2202 and the user operable dedicated anti-counterfeiting device scanner/reader 2204 or the computer device 2206 capable of at least scanning/reading the unique product identification codes are illustrated as capable of communicating with the processing server 2200 using the internet 2202. Also illustrated is a figurative representation of multiple blockchain nodes 2208 to 2218 operating as is described elsewhere illustrated to show the peer-to-peer communication network it is but that in actual operation that communication will use the internet.

The processing server 2200 may communicate with the blockchain nodes 2208 to 2218 using the internet 2202, each time a characteristic is received and processed, such that a dedicated block is added to a respective blockchain and enquiries to any of the nodes will allow inspection of each block in the blockchain. However, it is also possible for the processing server to have an associated blockchain node 2220 which is just another of the blockchain nodes, which thus allows the processing server to send the data to create a further block internally of the physical site of the processing server using a local network. This can obviate the need to encryption since the internal communication can be physically and electrically secured from external threats and attack vectors.

A further use of encryption, is by way of example, when an event that has a characteristic which is needs to be recorded is generated, as is illustrated in FIG. 5, by, again in an example, the device 2224 (which can be the same or different to 56d depicted in FIG. 5) being used at the facility 2222 (which can be the same of different to the storage factory 56 depicted in FIG. 5). Thus for example, the event is the delivery of milk to the factory and the recordable characteristic is the delivery time and date associated with the product being milk having a unique identifier. The generation of that record is encrypted with a public key and associated encryption algorithm and then communicated to the process server where it is decrypted using the private key. The record may also have been hashed before it was sent so after being decrypted the same hashing function is applied to the data record and if the hash product is the same as was sent and received then the data record is the same as was sent. The integrity and security of the record is provided for by using the techniques described but there are other ways to achieve a similar result.

Figure 16:
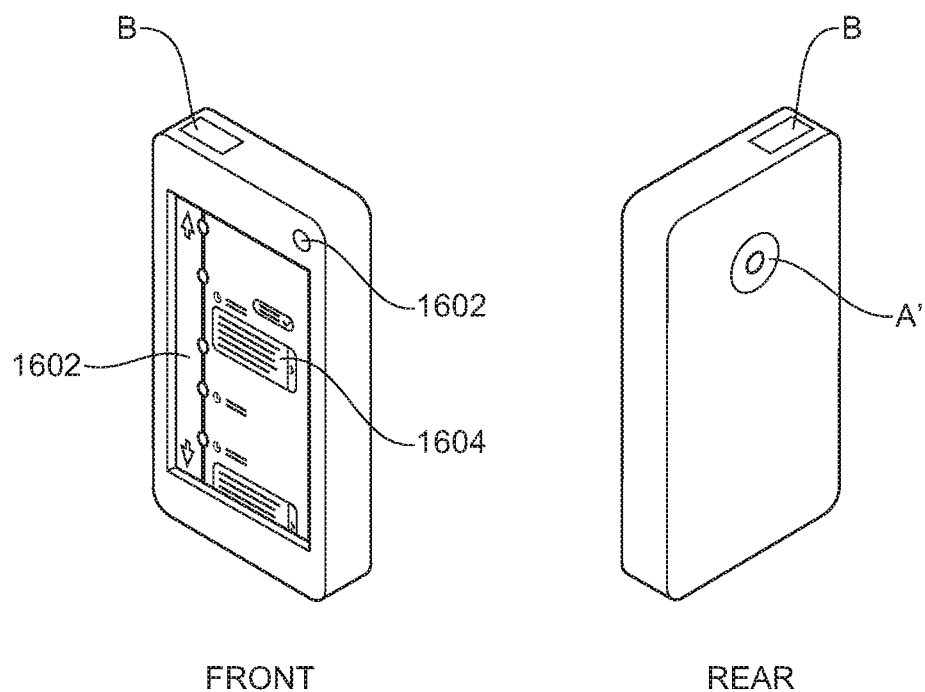
FIG. 16 depicts a representation of the external elements and an illustrative display on the reader device.

The user of the arrangement can use different devices, such as a mobile computer device 2206 of the nature of that depicted in FIG. 13 and/or a mobile or a kiosk based device of the nature of that depicted in FIG. 16. Each device provides a range of features but both may provide a verification checking program. As described in relation to FIG. 19 wherein the date and time of manufacture 193 at Manufacturer A 23 Aug. 2016 1717 hours is to be independently verified that process can take place by providing the enquiring device the ability to directly access the relevant block of the respective products' blockchain copies of which are distributed in the blockchain network 2208 to 2218, in one example, independent of the processing server. Such a query is specifically designed for in the blockchain arrangement and the result of such a query can verify the facts queried. The format of the verification to the user can have many forms, but in this embodiment the tick besides the Verified term in the display changes colour to show that the independent check has been carried out. The form of the data exchange between the devices 2204 or 2206 is a matter of conforming with the blockchain requirements for such queries and thus it may be that the verification output is something only shown to the user via a blockchain user interface which provides a level of independence from the provider of the provenance arrangement.

The described used of blockchain technology is illustrative of an application to the provenance verification process but it is also possible to use the technique in the fields of electronic commerce sales, Virtual Reality shopping and retail point Of Sale. (POS) as a proof of provenance and sale details.

The actual date and time of manufacture 193 at Manufacturer A 23 Aug. 2016 1717 hours is verified and made available. The Manufacturer A button provides an option to the user so they can learn more about that manufacturer The information can include the location, the facilities, a link to their web site and any other information which may not have been collected as part of the arrangement of collecting characteristics but rather supplied by the Manufacturer.

The actual product was delivered to a Transportation Centre A on 24 Aug. 2016 and that characteristic is verified 194.

The Transportation Centre A button provides an option to the user so they can learn more about that center. The information can include the location, the facilities, a link to their web site and any other information which may not have been collected as part of the arrangement of collecting characteristics but rather supplied by the Transportation Centre.

The date the actual product left the Transportation Centre A was 24 Aug. 2016 and is verified 195.

The date the actual product arrived at Distribution Centre A was 25 Aug. 2016 and is verified 196.

The Distribution Centre A button provides an option to the user so they can learn more about that centre. The information can include the location, the facilities, a link to their web site and any other information which may not have been collected as part of the arrangement of collecting characteristics but rather supplied by the Distribution Centre.

In the case of a product that has been purchased and has been scanned/interrogated by the computer device the actual date 26 Aug. 2016 and order number 123456 is available and verified 197.

Following from the order it is delivered to the customer on 27 Aug. 2016 and that characteristic is verified 198 by the customer signature on delivery.

FIG. 20 illustrates, as an example, the ability to inspect various characteristics associated with the actual ingredients of the actual product. FIG. 20 illustrates that various ingredients A, B, C, and D were used including information such as who the Manufacturer was and the date and time it was manufactured.

FIG. 21 depicts information relating to the manufacturer of an ingredient that can be accessed by actioning the Ingredient button that is provided an option to the user, so they can learn more about that ingredient. The information can include the location and the facilities from whence the ingredient was sourced, a link to the web site of the manufacturer and any other information which may not have been collected as part of the arrangement of collecting characteristics but rather supplied by the ingredient manufacturer.

The invention claimed is:

1. A method for managing and providing provenance of a product associated with an anti-counterfeiting device having a unique identifier, using a computer system having a computer server for processing data and a data memory device for receiving and storing data including unique identifiers of a product and anti-counterfeiting devices, where the product has at least a source version in a source phase and an anti-counterfeiting device is used in association with a source version of the product during the source, the method comprising the steps:

generation by the server of a unique identifier for a source version of the product;

storage in the data memory device of the unique identifier for a source version of the product;

association by the server in the data memory device of the unique identifier for a source version of the product with the unique identifier of the anti-counterfeit device;

receiving by the server and storage in the data memory device of one or more characteristics of the product existing or created during the source phase of the product;

association by the server in the data memory device the unique identifier of the source version of the product with each of one or more characteristics of the product existing or created during the source phase of the product;

receiving by the processor of the unique identifier of anti-counterfeit device with a query for the provenance of the source version of the product associated with the anti-counterfeiting device; and making available by the processor in response to the query of at least one characteristic associated with the source version of the product by using the unique identifier for the source version of the product to locate in the data memory device one or more of the characteristics of the product associated with the source version of the product.

2. A method for managing and providing provenance of a product according to claim 1 wherein a further anti-counterfeiting device is used in association with a packaged product, the method comprising the further steps:

abandonment of the anti-counterfeiting device associated with the source version of the product;

generation of a unique packaging identifier for each packaged version of a portioned sourced product;

association by the server in the data memory device of the unique packaging identifier with a respective packaged version of the product;

application of further anti-counterfeit devices each having a unique characteristic to each packaged version of the source product;

association by the server in the data memory device of the unique identifier for a packaged version of the product with the unique identifier of the anti-counterfeit device and the unique identifier of the source version of the product;

receiving by the server and storage in the data memory device of one or more characteristics of the packaged product existing or created during a the portioning of the source product;

receiving by the processor of the unique identifier of a further anti-counterfeit device with a query for the provenance of the packaged product associated with the associated further anti-counterfeiting device; and making available by the processor, in response to the query using the unique identifier for the packaged version of the product or the unique identifier of the further anti-counterfeiting device to locate in the data memory device, one or more of the characteristics of the product associated with the packaged product.

3. A method for managing and providing provenance of a product according to claim 1, the method comprising the steps:

application of an anti-counterfeit device having a unique identifier to a group of packaged versions of the product prepared for the distribution phase;

association by the server in the data memory device of a unique group packaging identifier with the unique identifier of the anti-counterfeit device applied to a group of packaged versions of the product;

receiving by the server and storage in the data memory device of one or more characteristics of the product existing or created during the distribution phase of the product;

association by the server in the data memory device the unique identifier of the group of packaged versions of the product with each of one or more characteristics of the product;

receiving by the processor of the unique identifier of anti-counterfeit device of a group of packaged versions of the product or a unique packaging identifier with a query for the provenance of the group of packaged versions of the product associated with the anti-counterfeiting device or unique packaging identifier; and making available by the processor, in response to the query using the unique identifier for the group of packaged versions of the product or the unique identifier of the anti-counterfeiting device applied to the group of packaged versions of the product to locate in the data memory device, one or more of the characteristics of the group of packaged products.

4. A device for displaying and confirming the provenance of a product, a computer system having a computer server for processing data and a data memory device for receiving and storing data including unique identifiers of a product and anti-counterfeiting devices and data representative of one or more characteristics of the product the device comprising:

a visual display for displaying information;

a communication mechanism for transmission and reception of information to and from the device with the computer system;

at least two sensors, each sensor adapted for receiving a different sensed input, each sensed input having one or more characteristics;

a digital data memory having stored therein a digital representation of expected characteristics for at least a first sensed input of one sensor and a second sensed input of another sensor;

a processor for comparing sensed inputs of sensors to the expected characteristics for sensed inputs stored in the digital data memory, wherein receipt of a first sensed input by a respective sensor by exposure to the product and confirmation by the processor of a match to at least one of the expected characteristics, prompts communication using the communication mechanism of a representation of the product to the computer system of provenance information and receipt by the communication mechanism of respective provenance information and a prompt to expose a second anti-counterfeiting device associated with the product to receive a second unique identifier as a second sensed input by a respective sensor, and confirmation by the processor of a match to at least one of the expected characteristics which confirms the provenance of the product and indicated to the user of the device using the visual display.

5. A method for managing and providing provenance of a product associated with an anti-counterfeiting device having a unique identifier, using a computer system having a computer server for processing data and a data memory device for receiving and storing data including unique identifiers of a product and anti-counterfeiting devices, where the product has at least a source version in a source phase and an anti-counterfeiting device is used in association with a source version of the product during the source, and a blockchain uniquely associated with a source version of the product, the method comprising the steps:

generation by the server of a unique identifier for a source version of the product;

storage in the data memory device of the unique identifier for a source version of the product;

association by the server in the data memory device of the unique identifier for a source version of the product with the unique identifier of the anti-counterfeit device;

receiving by the server and storage in the data memory device of one or more characteristics of the product existing or created during the source phase of the product;

association by the server in the data memory device the unique identifier of the source version of the product with each of one or more characteristics of the product existing or created during the source phase of the product;

generation of a record of the associated data in the memory device representative of a unique identifier of a source version of the product and at least one characteristic of the product and adapting the record to be capable of being added as a block to a blockchain uniquely associated with the source version of the product;

receiving by the processor of the unique identifier of anti-counterfeit device with a query for the provenance of the source version of the product associated with the anti-counterfeiting device;

making available by the processor in response to the query of at least one characteristic associated with the source version of the product by using the unique identifier for the source version of the product to locate in the data memory device one or more of the characteristics of the product associated with the source version of the product; and retrieving from the blockchain uniquely associated with the source version of the product the record associated with an added block and comparing the retrieved record with the associated characteristic of the product associated with the source version of the product.

* * * * *